US012095158B2

(12) United States Patent
Tsai et al.

(10) Patent No.: US 12,095,158 B2
(45) Date of Patent: Sep. 17, 2024

(54) ELECTRONIC DEVICE

(71) Applicant: Huawei Technologies Co., Ltd., Shenzhen (CN)

(72) Inventors: Chih Yu Tsai, Taipei (CN); Hanyang Wang, Reading (GB); Chien-Ming Lee, Shenzhen (CN); Dong Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 17/916,962

(22) PCT Filed: Mar. 18, 2021

(86) PCT No.: PCT/CN2021/081560
§ 371 (c)(1),
(2) Date: Oct. 4, 2022

(87) PCT Pub. No.: WO2021/203939
PCT Pub. Date: Oct. 14, 2021

(65) Prior Publication Data

US 2023/0163457 A1 May 25, 2023

(30) Foreign Application Priority Data

Apr. 10, 2020 (CN) ......................... 202010281254.0

(51) Int. Cl.
*H01Q 1/52* (2006.01)
*H01Q 1/24* (2006.01)

(52) U.S. Cl.
CPC ............ *H01Q 1/521* (2013.01); *H01Q 1/243* (2013.01)

(58) Field of Classification Search
CPC ............................... H01Q 1/521; H01Q 1/243
See application file for complete search history.

(56) References Cited

U.S. PATENT DOCUMENTS

2003/0193441 A1 10/2003 Zimmerman et al.
2012/0013519 A1 1/2012 Hakansson et al.
2013/0257674 A1 10/2013 Li et al.
(Continued)

FOREIGN PATENT DOCUMENTS

CN 102738570 A 10/2012
CN 102832452 A 12/2012
(Continued)

OTHER PUBLICATIONS

Qu, L. et al. "High-Sensitivity Ground Radiation Antenna System Using an Adjacent Slot for Bluetooth Headsets," IEEE Transactions on Antennas and Propagation, vol. 63, No. 12, Dec. 2015, 5 pages.
(Continued)

*Primary Examiner* — Graham P Smith
(74) *Attorney, Agent, or Firm* — Slater Matsil, LLP

(57) ABSTRACT

Embodiments of this application provide an electronic device, including a first decoupling member, a first radiator, a second radiator, a first feed unit, a second feed unit, and a rear cover. A first gap is formed between the first radiator and the second radiator. The first radiator includes a first feed point. The second radiator includes a second feed point. The first decoupling member is indirectly coupled to the first radiator and the second radiator, and the first decoupling member is disposed on a surface of the rear cover.

18 Claims, 25 Drawing Sheets

(56) References Cited

U.S. PATENT DOCUMENTS

| | | | |
|---|---|---|---|
| 2016/0218441 | A1 | 7/2016 | Tian et al. |
| 2017/0346179 | A1 | 11/2017 | Wu et al. |
| 2020/0076062 | A1 | 3/2020 | Lee et al. |

FOREIGN PATENT DOCUMENTS

| | | | |
|---|---|---|---|
| CN | 104979635 | A | 10/2015 |
| CN | 106921038 | A | 7/2017 |
| CN | 206878183 | U | 1/2018 |
| CN | 108736142 | A | 11/2018 |
| CN | 108736148 | A | 11/2018 |
| CN | 108767452 | A | 11/2018 |
| CN | 108847533 | A | 11/2018 |
| CN | 109659686 | A | 4/2019 |
| CN | 109980364 | A | 7/2019 |
| WO | 2020236245 | A1 | 11/2020 |

OTHER PUBLICATIONS

Yuan, Z. “Design of Ka Band Circularly Polarized Antenna Array,” Machinery & Electronics, vol. 37, No. 11, Nov. 2019, 4 pages.

Zaiping, N, “Antenna Engineering Handbook,” Zhangqiao Research, vol. 172, Jul. 2014, 4 pages.

ELECTRONIC DEVICE

CROSS-REFERENCE TO RELATED APPLICATIONS

This application is a National Stage of International Application No. PCT/CN2021/081560, filed on Mar. 18, 2021, which claims priority to Chinese Patent Application No. 202010281254.0, filed on Apr. 10, 2020, both of which are hereby incorporated by reference in their entireties.

TECHNICAL FIELD

This application relates to the field of wireless communication, and in particular, to an electronic device including a multi-antenna structure.

BACKGROUND

With an increasing requirement of a fifth generation (fifth generation, 5G) mobile communication terminal on a transmission speed, development of a sub-6 GHz multi-input multi-output (multi-input multi-output, MIMO) antenna system is accelerated. In the sub-6 GHz MIMO antenna system, a large quantity of antennas can be disposed at both a base station end and a terminal, and data is simultaneously transmitted on a plurality of channels in same time domain (time domain) and same frequency domain (frequency domain), so that spectral efficiency can be effectively improved and a data transmission speed can be greatly increased. Therefore, the system has become one of development focuses of a next-generation multi-gigabit (multi-gigabit) communication system. However, due to limited space in an electronic device, if any antenna involved is not miniaturized enough, it is difficult to apply the antenna to a large-screen narrow-bezel design specification of a current intelligent electronic device. In addition, in a MIMO antenna design, when several antennas operating on a same frequency band are jointly disposed in a terminal apparatus with limited space, interference between antennas within an excessively short distance becomes increasingly large, that is, isolation between the antennas increases greatly. Moreover, an envelope correlation coefficient (envelope correlation coefficient, ECC) between the antennas may be increased, and the data transmission speed may be reduced. In this case, a MIMO antenna architecture with low coupling and a low ECC becomes an implementation means of a MIMO antenna technology for communication in a sub-6 GHz frequency band. In addition, different countries may use different sub-6 GHz frequency bands (N77/N78/N79). Therefore, how to achieve a MIMO multi-antenna architecture operating on a plurality of frequency bands becomes an important technical research topic.

SUMMARY

An embodiment of this application provides an electronic device. The electronic device may include a multi-antenna structure. In a configuration that a plurality of antennas are compactly arranged, high isolation can be achieved in a designed frequency band, and good radiation efficiency and a low ECC of the antennas can also be maintained. Therefore, good communication quality is achieved.

According to a first aspect, an electronic device is provided, including: a first decoupling member, a first radiator, a second radiator, a first feed unit, a second feed unit, and a rear cover, where a first gap is formed between the first radiator and the second radiator. The first radiator includes a first feed point, the first feed unit provides feeding at the first feed point, and the first radiator does not include a ground point. The second radiator includes a second feed point, the second feed unit provides feeding at the second feed point, and the second radiator does not include a ground point. The first decoupling member is indirectly coupled to the first radiator and the second radiator. The first decoupling member is disposed on a surface of the rear cover. The first decoupling member does not overlap a first projection, and the first projection is a projection of the first radiator on the rear cover in a first direction. The first decoupling member does not overlap a second projection, and the second projection is a projection of the second radiator on the rear cover in the first direction. The first direction is a direction perpendicular to a plane on which the rear cover is located.

According to a technical solution in this embodiment of this application, when a plurality of antennas are compactly arranged and configured in narrow space in an electronic device, a neutralization line structure may be disposed near two antennas by using a floating metal technology, so that isolation of the plurality of antennas in a designed frequency band can be improved, current coupling between the plurality of antennas can be effectively reduced, and radiation efficiency of the plurality of antennas can be improved. Therefore, according to a multi-antenna design provided in this embodiment of this application, in a configuration in which a plurality of antennas are compactly arranged, high isolation can be achieved in the designed frequency band, and good radiation efficiency and a low ECC of the antennas can also be maintained. Therefore, good communication quality is achieved.

It should be understood that the first radiator does not include a ground point or the second radiator does not include a ground point may be considered as the first radiator or the second radiator does not include a ground point. A matching network may be disposed between a feed point and a feed unit for grounding. Therefore, a size of the radiator can be reduced.

With reference to the first aspect, in some implementations of the first aspect, the first feed point is disposed in a central region of the first radiator, and the second feed point is disposed in a central region of the second radiator.

According to the technical solution in this embodiment of this application, the first feed point is disposed in the central region of the first radiator, the second feed point is disposed in the central region of the second radiator, a first antenna formed by the first radiator may be a monopole antenna, and a second antenna formed by the second radiator may be a monopole antenna.

With reference to the first aspect, in some implementations of the first aspect, when the first feed unit provides feeding, the second radiator is coupled with the first radiator to generate a first induced current, the second radiator is coupled with the first decoupling member to generate a second induced current, and a direction of the first induced current is opposite to a direction of the second induced current.

According to the technical solution in this embodiment of this application, a direction of an induced current generated by the first radiator on the second radiator is opposite to a direction of an induced current generated by the first decoupling member on the second radiator, and the induced currents offset each other. This improves isolation between the first antenna formed by the first radiator and the second antenna formed by the second radiator.

With reference to the first aspect, in some implementations of the first aspect, when the second feed unit provides feeding, the first radiator is coupled with the second radiator to generate a third induced current, the first radiator is coupled with the first decoupling member to generate a fourth induced current, and a direction of the third induced current is opposite to a direction of the fourth induced current.

According to the technical solution in this embodiment of this application, a direction of an induced current generated by the second radiator on the first radiator is opposite to a direction of an induced current generated by the first decoupling member on the first radiator, and the induced currents offset each other. This improves isolation between the first antenna formed by the first radiator and the second antenna formed by the second radiator.

With reference to the first aspect, in some implementations of the first aspect, the first radiator, the second radiator, and the first decoupling member are symmetrical along the first gap.

According to the technical solution in this embodiment of this application, the direction of the first gap may be a direction in which a plane where the gap is located is perpendicular to the first gap. It should be understood that the antenna has a symmetrical structure, and good antenna performance.

With reference to the first aspect, in some implementations of the first aspect, the electronic device further includes a first parasitic stub and a second parasitic stub. The first parasitic stub is disposed on a side of the first radiator, and the second parasitic stub is disposed on one side of the second radiator.

According to the technical solution in this embodiment of this application, a plurality of parasitic stubs may be disposed near a radiator, so that more antenna modes may be excited. This further improves an efficiency bandwidth and radiation of an antenna.

With reference to the first aspect, in some implementations of the first aspect, the electronic device further includes: a third radiator, a fourth radiator, a second decoupling member, a third decoupling member, a fourth decoupling member, a third feed unit, and a fourth feed unit. A second gap is formed between the second radiator and the third radiator, a third gap is formed between the third radiator and the fourth radiator, and a fourth gap is formed between the fourth radiator and the first radiator. The third radiator includes a third feed point, and the third feed unit provides feeding at the third feed point. The fourth radiator includes a fourth feed point, and the fourth feed unit provides feeding at the fourth feed point. The first decoupling member, the second decoupling member, the third decoupling member, and the fourth decoupling member are disposed on an outer side of a region enclosed by the first projection, the second projection, the third projection, and the fourth projection. The third projection is a projection of the third radiator on the rear cover in the first direction, and the fourth projection is a projection of the fourth radiator on the rear cover in the first direction. The second decoupling member, the third decoupling member, and the fourth decoupling member are disposed on the surface of the rear cover.

According to the technical solution in this embodiment of this application, isolation between adjacent antenna units in antenna units can be improved by disposing a decoupling member, to meet a requirement of a MIMO system. The first radiator, the second radiator, the third radiator, and the fourth radiator may not include a ground point, to form an antenna array formed by four monopole subunits.

With reference to the first aspect, in some implementations of the first aspect, the first feed point is disposed in a central region of the first radiator. The second feed point is disposed in a central region of the second radiator. The third feed point is disposed in a central region of the third radiator. The fourth feed point is disposed in a central region of the fourth radiator.

According to the technical solution in this embodiment of this application, each antenna unit in a multi-antenna solution may be an antenna operating on a single band.

With reference to the first aspect, in some implementations of the first aspect, the first radiator, the second radiator, the third radiator, and the fourth radiator are arranged in a form of a 2×2 array or in an annular manner.

According to the technical solution in this embodiment of this application, a multi-antenna array may be disposed according to the antenna solution in this application.

With reference to the first aspect, in some implementations of the first aspect, the electronic device further includes: a first neutralization member and a second neutralization member. The first neutralization member and the second neutralization member are disposed on an inner side of a region enclosed by the first projection, the second projection, the third projection, and the fourth projection, or on an inner side of a region enclosed by the first radiator, the second radiator, the third radiator, and the fourth radiator. One end of the first neutralization member is close to the first radiator, and the other end is close to the third radiator. One end of the second neutralization member is close to the second radiator, and the other end is close to the fourth radiator.

According to the technical solution in this embodiment of this application, isolation between antennas may be further improved by disposing a neutralization member on the inner side of the region enclosed by the first projection, the second projection, the third projection, and the fourth projection.

With reference to the first aspect, in some implementations of the first aspect, when the first neutralization member and the second neutralization member are disposed on the surface of the rear cover, the first neutralization member partially overlaps the first projection and the third projection in the first direction. The second neutralization member partially overlaps the second projection and the fourth projection in the first direction.

According to the technical solution in this embodiment of this application, when the first neutralization member and the second neutralization member are disposed on the rear cover of the electronic device, the first neutralization member and the second neutralization member may partially overlap a corresponding radiator in a vertical direction. This further improves isolation between antennas.

With reference to the first aspect, in some implementations of the first aspect, the electronic device further includes an antenna support. The first radiator, the second radiator, the third radiator, and the fourth radiator are disposed on a surface of the antenna support.

According to the technical solution in this embodiment of this application, the first radiator, the second radiator, the third radiator, and the fourth radiator may be disposed on the antenna support or a PCB of a terminal device based on an actual situation. Alternatively, when the decoupling member is disposed on an outer surface of the rear cover, the first radiator and the second radiator may alternatively be disposed on the inner surface of the rear cover.

With reference to the first aspect, in some implementations of the first aspect, the first neutralization member is disposed on the surface of the rear cover, and the second neutralization member is disposed on the surface of the antenna support. Alternatively, the first neutralization member is disposed on the surface of the antenna support, and the second neutralization member is disposed on the surface of the rear cover. Alternatively, the first neutralization member and the second neutralization member are disposed on the surface of the rear cover. Alternatively, the first neutralization member and the second neutralization member are disposed on the surface of the antenna support.

According to the technical solution in this embodiment of this application, the first neutralization member and the second neutralization member may have different coupling spacings with the support on which the radiator is located. Therefore, if a difference between different coupling spacings is designed, resonance paths of the first neutralization member and the second neutralization member can be effectively separated. This achieves an effect that the first neutralization member and the second neutralization member can be separately configured at different layers.

With reference to the first aspect, in some implementations of the first aspect, the first decoupling member, the second decoupling member, the third decoupling member, and the fourth decoupling member are polyline-shaped.

According to the technical solution in this embodiment of this application, in an extension design, if the decoupling member changes from straight-line-shaped to polyline-shaped, radiation performance of the antenna structure in an operating frequency band can be further improved. At the same time, the structural design can improve a design freedom of the decoupling member in two-dimensional space.

With reference to the first aspect, in some implementations of the first aspect, a length of the first decoupling member is a half of a wavelength corresponding to a resonance point of a resonance generated by the first radiator or the second radiator.

According to the technical solution in this embodiment of this application, the resonance point of the resonance generated by the first radiator or the second radiator may be a resonance point of a resonance generated by the first antenna, or a resonance point generated by the second antenna, or may be a center frequency in an operating frequency band of an antenna. It should be understood that isolation between feed points of the antenna may be controlled by adjusting the length of the decoupling member. The length of the decoupling member may be adjusted to meet indicator requirements of antennas of different structures.

With reference to the first aspect, in some implementations of the first aspect, a distance between the first radiator and the second radiator ranges from 3 mm to 15 mm.

According to the technical solution in this embodiment of this application, when a distance between the first radiator and the second radiator is 9.5 mm, antenna performance is good. It should be understood that adjustment may be performed according to an actual design or production requirement.

With reference to the first aspect, in some implementations of the first aspect, a coupling gap between the decoupling member and each of the first radiator and the second radiator ranges from 0.1 mm to 3 mm.

According to the technical solution in this embodiment of this application, when the coupling gap between the decoupling member and each of the first radiator and the second radiator is 2 mm, antenna performance is good. It should be understood that adjustment may be performed according to an actual design or production requirement.

According to a second aspect, an electronic device is provided, including: a first decoupling member, a first radiator, a second radiator, a first feed unit, a second feed unit, and a rear cover. A first gap is formed between the first radiator and the second radiator, the first radiator includes a first feed point, and the first feed unit provides feeding at the first feed point. The second radiator includes a second feed point, and the second feed unit provides feeding at the second feed point. The first decoupling member is indirectly coupled to the first radiator and the second radiator, and the first decoupling member is disposed on a surface of the rear cover. When the first feed unit provides feeding, the second radiator is coupled with the first radiator to generate a first induced current, the second radiator is coupled with the first decoupling member to generate a second induced current, and a direction of the first induced current is opposite to a direction of the second induced current. When the second feed unit provides feeding, the first radiator is coupled with the second radiator to generate a third induced current, the first radiator is coupled with the first decoupling member to generate a fourth induced current, and a direction of the third induced current is opposite to a direction of the fourth induced current.

With reference to the second aspect, in some implementations of the second aspect, the first feed point is disposed in a central region of the first radiator, and the second feed point is disposed in a central region of the second radiator.

With reference to the second aspect, in some implementations of the second aspect, the first radiator, the second radiator, and the first decoupling member are symmetrical along the first gap.

With reference to the second aspect, in some implementations of the second aspect, the electronic device further includes a first parasitic stub and a second parasitic stub. The first parasitic stub is disposed on a side of the first radiator, and the second parasitic stub is disposed on one side of the second radiator.

With reference to the second aspect, in some implementations of the second aspect, the electronic device further includes: a third radiator, a fourth radiator, a second decoupling member, a third decoupling member, a fourth decoupling member, a third feed unit, and a fourth feed unit. A second gap is formed between the second radiator and the third radiator, a third gap is formed between the third radiator and the fourth radiator, and a fourth gap is formed between the fourth radiator and the first radiator. The third radiator includes a third feed point, and the third feed unit provides feeding at the third feed point. The fourth radiator includes a fourth feed point, and the fourth feed unit provides feeding at the fourth feed point. The first decoupling member, the second decoupling member, the third decoupling member, and the fourth decoupling member are disposed on an outer side of a region enclosed by the first projection, the second projection, the third projection, and the fourth projection. The third projection is a projection of the third radiator on the rear cover in the first direction, and the fourth projection is a projection of the fourth radiator on the rear cover in the first direction. The second decoupling member, the third decoupling member, and the fourth decoupling member are disposed on the surface of the rear cover.

With reference to the second aspect, in some implementations of the second aspect, the first feed point is disposed in a central region of the first radiator, the second feed point is disposed in a central region of the second radiator, the third feed point is disposed in a central region of the third radiator, and the fourth feed point is disposed in a central region of the fourth radiator.

With reference to the second aspect, in some implementations of the second aspect, the first radiator, the second radiator, the third radiator, and the fourth radiator are arranged in a form of a 2×2 array or in an annular manner.

With reference to the second aspect, in some implementations of the second aspect, the electronic device further includes: a first neutralization member and a second neutralization member. The first neutralization member and the second neutralization member are disposed on an inner side of a region enclosed by the first projection, the second projection, the third projection, and the fourth projection, or an inner side of a region enclosed by the first radiator, the second radiator, the third radiator, and the fourth radiator. One end of the first neutralization member is close to the first radiator, and the other end is close to the third radiator. One end of the second neutralization member is close to the second radiator, and the other end is close to the fourth radiator.

With reference to the second aspect, in some implementations of the second aspect, when the first neutralization member and the second neutralization member are disposed on the surface of the rear cover, the first neutralization member partially overlaps the first projection and the third projection in the first direction. The second neutralization member partially overlaps the second projection and the fourth projection in the first direction.

With reference to the second aspect, in some implementations of the second aspect, the electronic device further includes an antenna support. The first radiator, the second radiator, the third radiator, and the fourth radiator are disposed on a surface of the antenna support.

With reference to the second aspect, in some implementations of the second aspect, the first neutralization member is disposed on the surface of the rear cover, and the second neutralization member is disposed on the surface of the antenna support. Alternatively, the first neutralization member is disposed on the surface of the antenna support, and the second neutralization member is disposed on the surface of the rear cover. Alternatively, the first neutralization member and the second neutralization member are disposed on the surface of the rear cover. Alternatively, the first neutralization member and the second neutralization member are disposed on the surface of the antenna support.

With reference to the second aspect, in some implementations of the second aspect, the first decoupling member, the second decoupling member, the third decoupling member, and the fourth decoupling member are polyline-shaped.

With reference to the second aspect, in some implementations of the second aspect, a length of the first decoupling member is a half of a wavelength corresponding to a resonance point of a resonance generated by the first radiator or the second radiator.

With reference to the second aspect, in some implementations of the second aspect, a distance between the first radiator and the second radiator ranges from 3 mm to 15 mm.

With reference to the second aspect, in some implementations of the second aspect, a coupling gap between the decoupling member and each of the first radiator and the second radiator ranges from 0.1 mm to 3 mm.

With reference to the second aspect, in some implementations of the second aspect, the first feed unit and the second feed unit are a same feed unit.

DETAILED DESCRIPTION OF ILLUSTRATIVE EMBODIMENTS

The following describes technical solutions of this application with reference to accompanying drawings.

An electronic device in embodiments of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, an in-vehicle device, a terminal device in a 5G network, a terminal device in a future evolved public land mobile network (public land mobile network, PLMN), or the like. This is not limited in this embodiment of this application.

Figure 1:
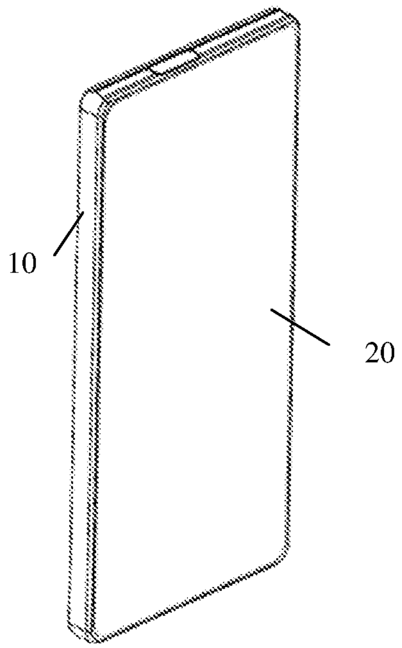
FIG. 1 is a schematic diagram of an electronic device according to an embodiment of this application.

FIG. 1 is a schematic diagram of an electronic device according to an embodiment of this application. Herein, an example in which the electronic device is a mobile phone is used for description.

As shown in FIG. 1, the electronic device has a shape similar to a cube, and may include a bezel 10 and a display 20. Both the bezel 10 and the display 20 may be mounted on a middle frame (not shown in the figure). The bezel 10 may be divided into an upper bezel, a lower bezel, a left bezel, and a right bezel. These bezels are connected to each other, and may form a specific radian or chamfer at a joint.

The electronic device further includes a printed circuit board (printed circuit board, PCB) disposed inside. Electronic components may be disposed on the PCB. The electronic components may include a capacitor, an inductor, a resistor, a processor, a camera, a flash, a microphone, a battery, and the like, but are not limited thereto.

The bezel 10 may be a metal bezel made of metals such as copper, a magnesium alloy, or stainless steel, or may be a plastic bezel, a glass bezel, a ceramic bezel, or the like, or may be a bezel combining metal and plastic.

As a user's requirement for a data transmission rate increases, a capability of simultaneous transmission and simultaneous reception of a MIMO multi-antenna system gradually attracts attention. It can be seen that an operation of the MIMO multi-antenna system becomes a trend in the future. However, how to integrate and implement the MIMO multi-antenna system in an electronic device with limited space and achieve good antenna radiation efficiency of each antenna is a technical challenge that is difficult to overcome. When several antennas operating in a same frequency band are jointly designed in a same electronic device with limited space, a distance between the antennas is excessively short, and interference between the antennas becomes increasingly severe, that is, isolation between the antennas is greatly improved. In addition, an ECC among a plurality of antennas may be increased, so that a case in which radiation of an antenna is weakened may occur. Consequently, a decrease in the data transmission rate is caused, and a technical difficulty in a multi-antenna integration design is increased.

Figure 2:
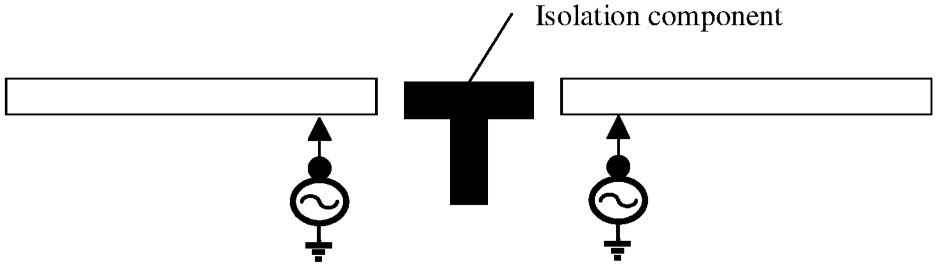
FIG. 2 is a schematic diagram of an antenna structure.

As shown in FIG. 2, some documents in the conventional technology have proposed that an isolation component (for example, a protruding ground plane, a short-circuit metal component, or a spiral groove) is additionally disposed between two antennas, and a size of the isolation component is designed to be close to a resonance frequency of a frequency band of the two antennas for improving isolation, so as to reduce current coupling between the antennas. However, this design reduces current coupling between antennas, and also reduces radiation efficiency of the antennas. In addition, the use of the isolation component requires specific space for configuration. This also increases a design size of an overall antenna structure. In addition, a specific ground plane shape is used to improve the isolation between the two antennas. Generally, an L-shaped groove structure is cut on the ground plane of the two antennas, so that current coupling between the two antennas can be reduced. However, the groove structure occupies a large area, so that impedance matching and radiation of other antennas are easily affected. In addition, such a design manner may trigger an additional coupling current, thereby increasing an envelope correlation coefficient between adjacent antennas. In the foregoing technologies for improving isolation between two antennas, the use of the isolation component requires specific space for configuration, so that an overall design size of an antenna is increased. Therefore, an electronic device cannot meet a multi-antenna design requirement of high efficiency and miniaturization at the same time.

According to a multi-antenna technical solution provided in this embodiment of this application, when a plurality of antennas are compactly arranged and configured in narrow space in an electronic device, a neutralization line structure may be disposed near antennas by using a floating metal (floating metal, FLM) technology, so that isolation of the plurality of antennas in a designed frequency band can be improved, current coupling between the plurality of antennas can be effectively reduced, and radiation efficiency of the plurality of antennas can be improved. Therefore, according to a multi-antenna design provided in this embodiment of this application, in a configuration that a plurality of antennas are compactly arranged, high isolation can be achieved in the designed frequency band, and good radiation efficiency and a low ECC of the antennas can also be maintained. Therefore, good communication quality is achieved.

Figure 3:
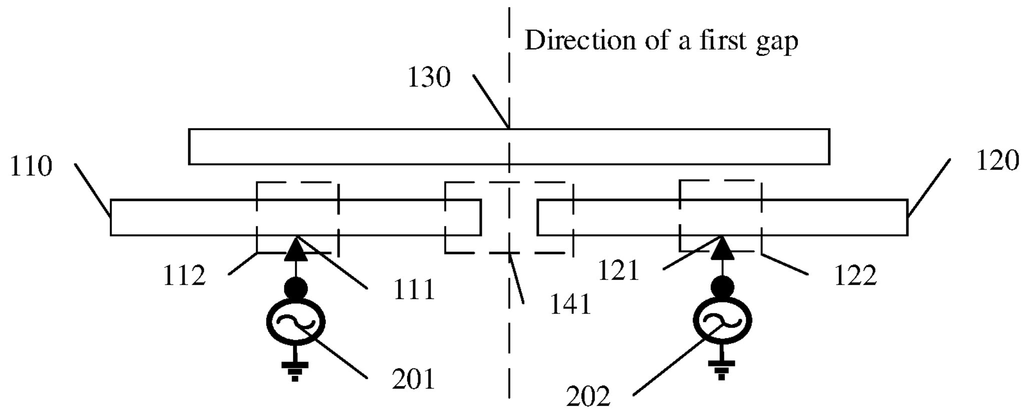
FIG. 3 is a schematic diagram of an antenna structure according to an embodiment of this application.
Figure 4:
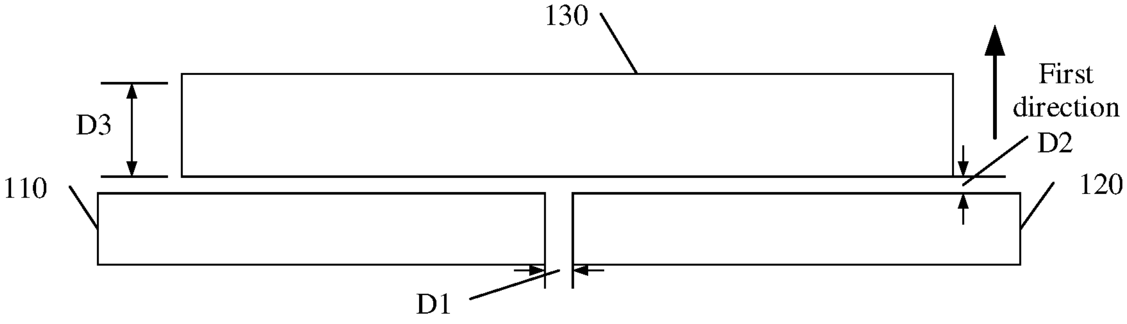
FIG. 4 is a top view of an antenna according to an embodiment of this application.
Figure 5:
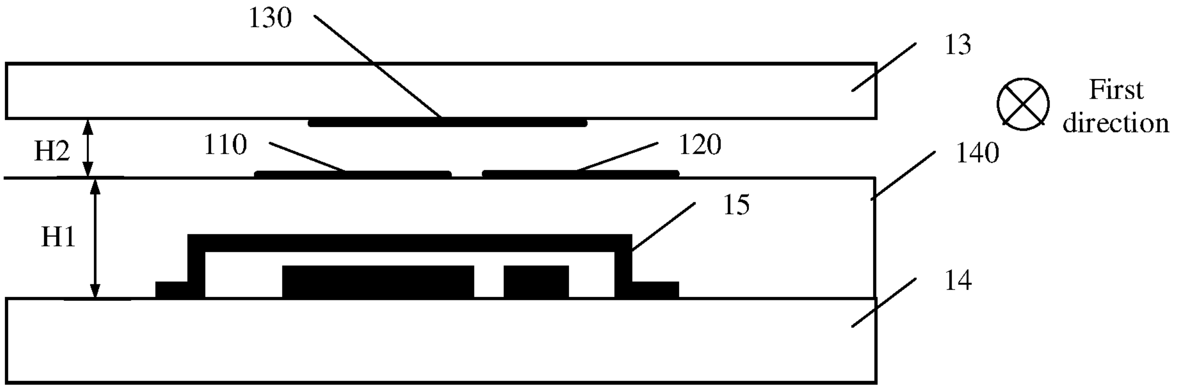
FIG. 5 is a top view of an antenna according to an embodiment of this application.
Figure 6:
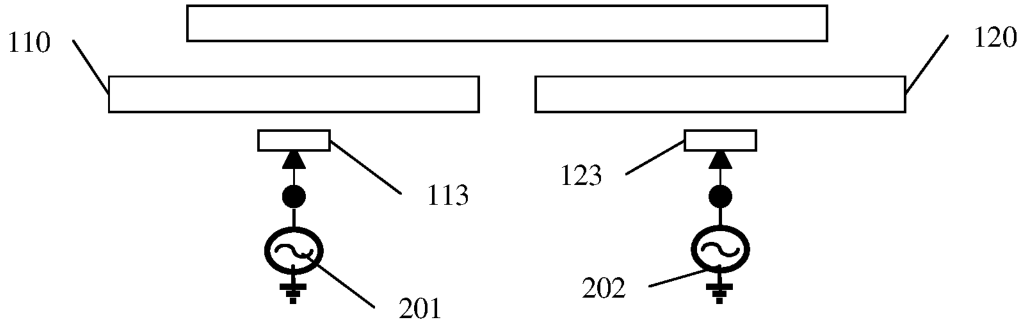
FIG. 6 is a schematic diagram of another antenna structure according to an embodiment of this application.

FIG. 3 to FIG. 6 are each a schematic diagram of an antenna structure according to an embodiment of this application. The antennas may be applied to an electronic device. FIG. 3 is a schematic diagram of an antenna structure according to an embodiment of this application. FIG. 4 is a top view of an antenna according to an embodiment of this application. FIG. 5 is a side view of an antenna according to an embodiment of this application. FIG. 6 is a schematic diagram of another antenna structure according to an embodiment of this application.

As shown in FIG. 3, the antennas may include a first radiator 110, a second radiator 120, and a first decoupling member 130.

A first gap 141 is formed between the first radiator 110 and the second radiator 120. The first radiator 110 may include a first feed point 111, and may be disposed on a surface of the first radiator. The first radiator 110 may be electrically connected to the first feed unit 201 at the first feed point 111, and the first feed unit 201 provides energy for the antenna to form a first antenna. The second radiator 120 may include a second feed point 121, and may be disposed on a surface of the second radiator. The second radiator 120 may be electrically connected to the second feed unit 202 at the second feed point 122, and the second feed unit 202 provides energy for the antenna to form a second antenna. It should be understood that the first radiator 110 may not include a ground point, or the second radiator 110 may not include a ground point. A matching network may be disposed between a feed point and a feed unit for grounding. Therefore, a size of the radiator can be reduced. In this case, the first antenna and the second antenna may be monopole antennas, and a generated resonance is a common-mode (common-mode, CM) mode.

The first decoupling member 130 is indirectly coupled to the first radiator 110 and the second radiator 120. It should be understood that indirect coupling is a concept relative to direct coupling, that is, mid-air coupling, it means that the first decoupling member 130 and the first radiator 110 or the second radiator 120 are not directly electrically connected.

Optionally, the first feed unit 201 and the second feed unit 202 may be a same feed unit, for example, may be a power supply chip in the electronic device.

Optionally, the first feed point in may be disposed in a central region 112 of the first radiator. It should be understood that the central region 112 of the first radiator 110 may be a region around a geometric center of the first radiator 110, so that the first antenna can generate a single resonance.

Optionally, the second feed point 121 may be disposed in a central region 122 of the second radiator. It should be understood that the central region 122 of the second radiator 120 may be a region around a geometric center of the second radiator 120, so that the second antenna can generate a single resonance.

Optionally, the first radiator 110 may be grounded at the first feed point 111 through a matching network. After the first radiator 110 is grounded, a length of the first radiator 110 may be shortened from a half of an operating wavelength to a quarter of the operating wavelength.

Optionally, the second radiator 120 may be grounded at the second feed point 121 through a matching network. After the second radiator 120 is grounded, a length of the second radiator 120 may be shortened from a half of an operating wavelength to a quarter of the operating wavelength.

Optionally, the first radiator 110, the second radiator 120, and the first decoupling member 130 may be symmetrical along the first gap 141. The direction of the first gap 141 may be a direction where a plane in which the first gap 141 is located is perpendicular to the first gap. It should be understood that the antenna has a symmetrical structure, and good antenna performance.

As shown in FIG. 4 and FIG. 5, the first decoupling member 130 may be disposed on a surface of the rear cover 13 of the electronic device, and is configured to improve isolation between a first antenna formed by the first radiator 110 and a second antenna formed by the second radiator 120.

The first decoupling member 130 does not overlap a first projection, and the first projection is a projection of the first radiator 110 on the rear cover 13 in a first direction. The first decoupling member 130 does not overlap a second projection, and the second projection is a projection of the second radiator 120 on the rear cover 13 in the first direction. The first direction is a direction perpendicular to a plane on which the rear cover 13 is located. It should be understood that, being perpendicular to a plane on which the rear cover 13 is located may be understood as having an included angle of approximately 90° with the plane on which the rear cover 13 is located. It should be understood that, being perpendicular to a plane on which the rear cover is located is also equivalent to being perpendicular to a plane on which a screen, a middle frame, or a mainboard of the electronic device is located.

Optionally, the rear cover 13 of the electronic device may be made of a nonmetallic material such as glass or ceramic.

Optionally, a length of the first decoupling member 130 may be half of a wavelength corresponding to a resonance point of a resonance generated by the first radiator or the second radiator. It should be understood that the resonance point of the resonance generated by the first radiator or the second radiator may be a resonance point of the resonance generated by the first antenna, or a resonance point generated by the second antenna, or may be a center frequency of an operating frequency band of the antenna. When the antenna operates in a N78 frequency band (3.3 GHz to 3.8 GHz), a length of the first decoupling member 130 may be 48 mm.

It should be understood that isolation between feed points of the antenna may be controlled by adjusting the length of the first decoupling member 130. The length of the first decoupling member 130 may be adjusted to meet indicator requirements of antennas of different structures.

Optionally, a distance D1 between the first radiator 110 and the second radiator 120 may be 9 mm, 9.5 mm, or 10 mm. For ease of description, in this embodiment of this application, that the distance D1 between the first radiator 110 and the second radiator 120 is 9.5 mm is used as example for description, that is, a width of the first gap is 9.5 mm. A coupling gap D2 between the first decoupling member 130 and each of the first radiator 110 and the second radiator 120 in a horizontal direction may be 2 mm. A width D3 of the first decoupling member 130 may be 3 mm. It should be understood that a specific value of the distance D1, the coupling gap D2, or the width D3 is not limited in this application, and may be adjusted based on an actual design or production requirement.

It should be understood that the width D1 of the gap may be a straight-line distance between points closest to the first radiator 110 and the second radiator 120. The coupling gap D2 between the decoupling member 130 and each of the first radiator 110 and the second radiator 120 in the horizontal direction may be considered as a straight-line distance between the decoupling member 130 and a point closest to the first radiator 110 or the second radiator 120 in the horizontal direction.

Optionally, the distance D1 between the first radiator 110 and the second radiator 120 may range from 3 mm to 15 mm, that is, the width D1 of the first gap may range from 3 mm to 10 mm.

Optionally, the coupling gap D2 between the first decoupling member 130 and each of the first radiator 110 and the second radiator 120 in a horizontal direction may range from 0.1 mm to 3 mm.

Optionally, the coupling gap D2 between the first decoupling member 130 and each of the first radiator 110 and the second radiator 120 in the horizontal direction is adjusted, so that a location of the antenna at an isolation peak in a designed frequency band can be effectively controlled. By adjusting the width D3 of the first decoupling member 130, a frequency increase/decrease location at the isolation peak between the antennas in the designed frequency band can also be controlled. In addition, this adjustment manner has little impact on a radiation mode of the antenna in the frequency band, and related adjustment may be performed according to a setting requirement.

Optionally, the antenna may further include an antenna support 150, and the first radiator 110 and the second radiator 120 may be disposed on a surface of the antenna support.

It should be understood that the first radiator 110 and the second radiator 120 may also be disposed on a surface of a PCB of the electronic device, and the first decoupling member 130 may be disposed on the antenna support or a rear cover of the electronic device.

Optionally, the antenna support 150 may be disposed between a PCB 14 and the rear cover 13 of the electronic device. A shielding can 15 may be disposed on a surface that is of the PCB 14 and that is close to the antenna support, and the shielding can 15 may be configured to protect an electronic component on the PCB 14 from interference from an external electromagnetic environment. The first decoupling member 130 may be disposed on a surface that is of the rear cover 13 and that is close to the antenna support 160. A distance H1 between the PCB 14 and the antenna support 150 may be 3.0 mm, a distance H2 between the antenna support 160 and the rear cover 13 may be 0.3 mm, and a thickness of the rear cover 13 may be 0.8 mm.

It should be understood that, when the first antenna and the second antenna are compactly arranged and configured in narrow space of the electronic device, radiation portions of the two antennas are coupled to the first decoupling member, so that isolation between the two antennas in a designed frequency band can be improved, current coupling between the two antennas can be effectively reduced, and radiation efficiency of the two antennas can be improved. A design manner in which the first decoupling member is coupled to a dual-antenna radiator is different from a design manner in which the first decoupling member is directly connected to a dual-antenna radiator or the first decoupling member is disposed between radiators in the conventional technology. In this application, the first decoupling member is disposed on the rear cover of the electronic device, so that the antenna integrally occupies a small area, and has a compact structure.

As shown in FIG. 6, the antennas may further include a first metal spring plate 113 and a second metal spring plate 123.

One end of the first metal spring plate 113 is electrically connected to the first feed unit 201, and the other end is coupled to the first radiator 110 at the first feed point, that is, the first feed unit 201 is coupled to and feeds the first radiator 110 at the first feed point. One end of the second metal spring plate 123 is electrically connected to the second feed unit 202, and the other end is coupled to the second radiator 120 at the second feed point, that is, the second feed unit 202 is coupled to and feeds the second radiator 120 at the second feed point. In this case, the first antenna formed by the first radiator 110 is a coupling monopole antenna. The second antenna formed by the second radiator 120 is a coupling monopole antenna.

Optionally, coupling connection may be a direct coupling connection or an indirect coupling connection.

It should be understood that, to implement a coupled feeding or grounding structure in the antenna structure, a metal patch may also be designed on a PCB of the electronic device. After the metal patch is disposed on the PCB, a distance between the metal patch and the radiator increases. Therefore, a coupling area can be correspondingly increased, and a same effect can also be achieved. A manner of coupled feeding or coupled grounding is not limited in this application.

Figure 7:
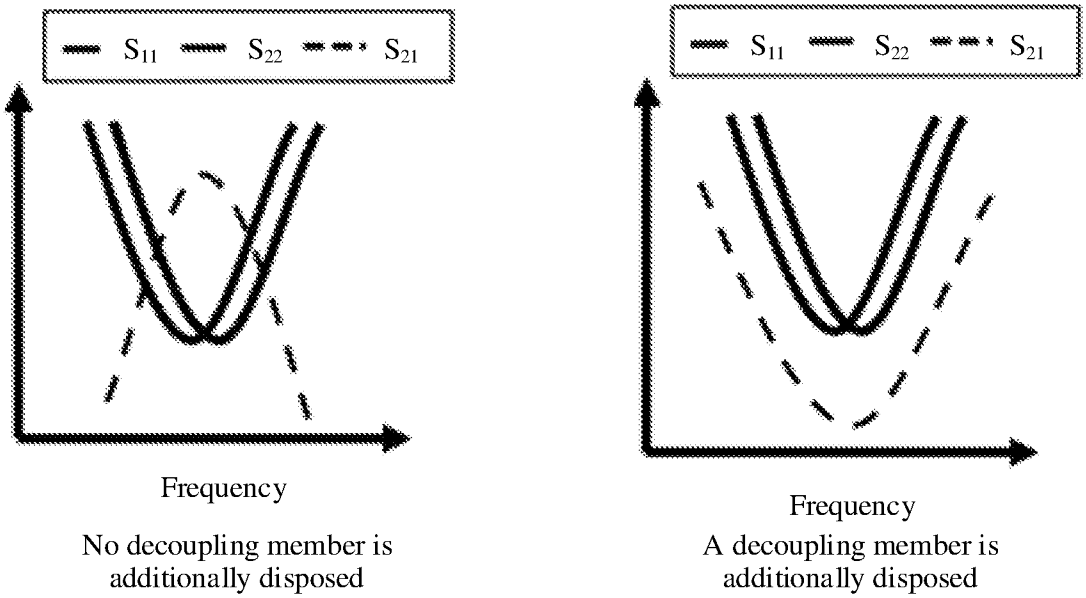
FIG. 7 is a schematic diagram of comparison between S parameters of different antenna structures according to an embodiment of this application.

FIG. 7 is a schematic diagram of comparison between S parameters of different antenna structures according to an embodiment of this application. On a left side, there is a simulation result diagram of an antenna structure to which no first decoupling member is additionally deposed. On a right side, there is a simulation result diagram of an antenna structure to which a first decoupling member is additionally disposed.

In the antenna structure shown in FIG. 6, both the first antenna and the second antenna are coupling monopole antennas. When no first decoupling member is additionally disposed in the antenna structure, and a distance between the first antenna and the second antenna is 9.5 mm, near-field current coupling between the two antennas is high. As a result, isolation between the first antenna and the second antenna in a common operating frequency band is poor. As shown in a left simulation diagram in FIG. 7, it is expected that this result is difficult to be applied to a MIMO multi-antenna system. However, after the first decoupling member is additionally disposed in the antenna structure, when the distance between the first antenna and the second antenna is also 9.5 mm and the first decoupling member is coupled, because there is a coupling gap between a radiator and the first decoupling member, a surface current of a ground part of the electronic device may be bound to the first decoupling member. In other words, in the technical solution of this application, a current coupled from the first feed point of the first antenna to the second feed point of the second antenna can be offset, to improve near-field isolation between the two antennas and improve efficiency performance of the two antennas, as shown in a right simulation diagram in FIG. 7.

It should be understood that a location of an isolation peak between the two antennas in a designed frequency band can be effectively controlled by adjusting a width D3 of the first decoupling member. This has little impact on a modal of the two antennas.

Figure 8:
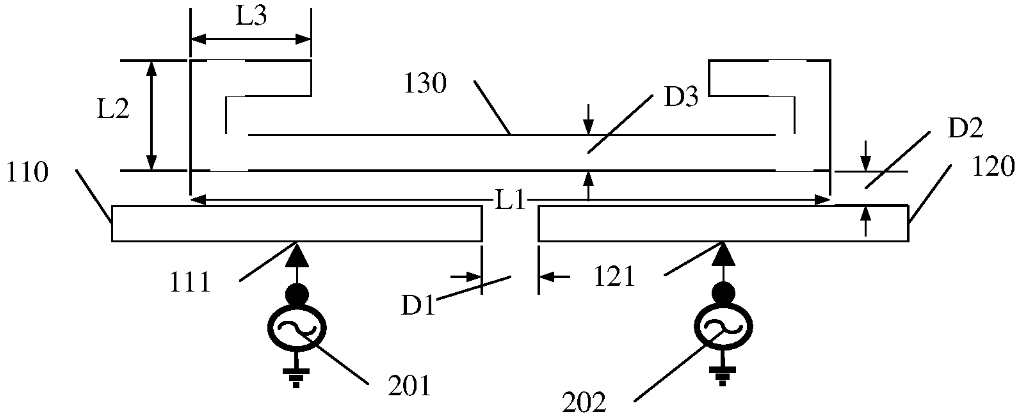
FIG. 8 is a schematic diagram of still another antenna structure according to an embodiment of this application.

FIG. 8 is a schematic diagram of still another antenna structure according to an embodiment of this application.

As shown in FIG. 8, the first decoupling member 130 may be polyline-shaped. For ease of description, an example in which a first decoupling member is C-shaped is used in the following embodiment. It should be understood that a shape of the first decoupling member 130 is not limited in this application.

Optionally, a distance D1 between the first radiator 110 and the second radiator 120 may be 9.5 mm, that is, a width of a first gap is 9.5 mm. A coupling gap D2 between the first decoupling member 130 and each of the first radiator 110 and the second radiator 120 in a horizontal direction may be 2 mm. A width D3 of the first decoupling member 130 may be 3 mm. Lengths L1, L2, and L3 of each side of the C-shaped first decoupling member 130 may be 27 mm, 7 mm, and 5 mm respectively, and a length of the first decoupling member 130 may be half of an operating wavelength.

It should be understood that a design of the C-shaped first decoupling member is similar to a decoupling effect of the straight-line first decoupling member shown in FIG. 3. Therefore, the first decoupling member 130 coupled between the first antenna and the second antenna may be considered as a decoupling structure in an antenna structure, so that the antennas achieve low coupling.

Figure 9:
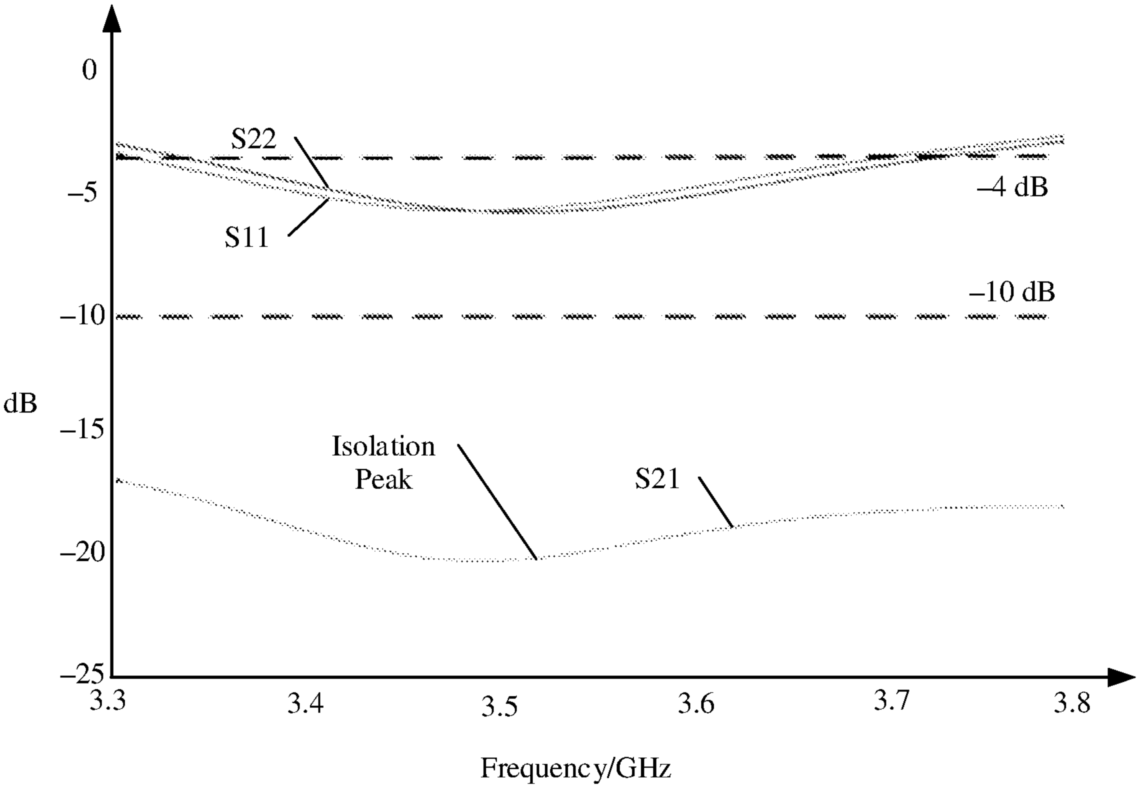
FIG. 9 is an S parameter simulation result of the antenna structure shown in FIG. 8.
Figure 10:
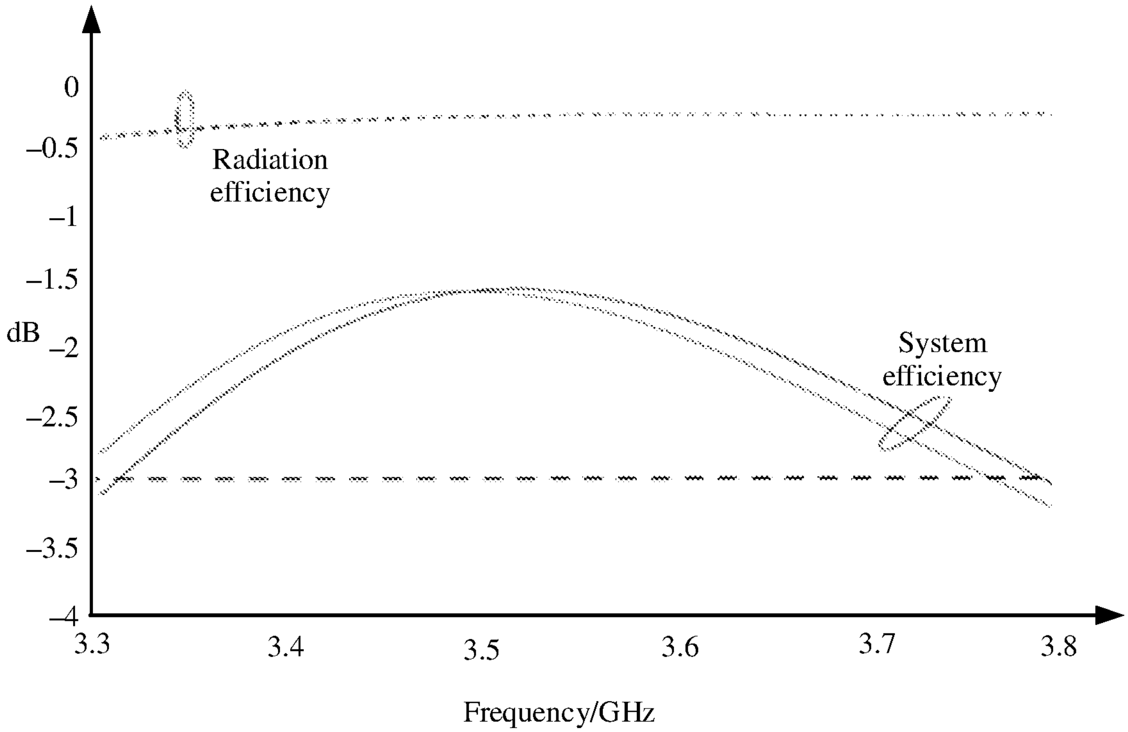
FIG. 10 is an efficiency simulation result of the antenna structure shown in FIG. 8.
Figure 11:
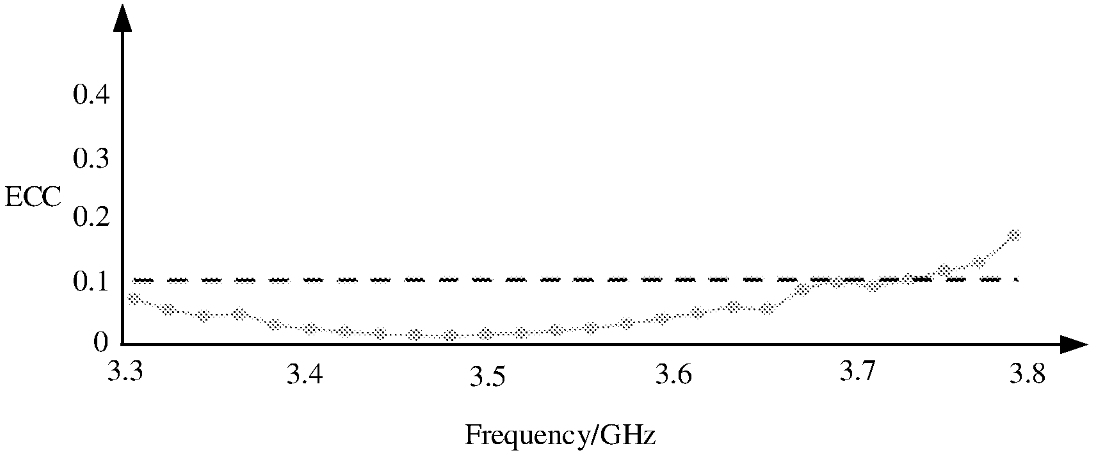
FIG. 11 is an ECC simulation result of the antenna structure shown in FIG. 8.

FIG. 9 to FIG. 11 are schematic diagrams of simulation results of the antenna structure shown in FIG. 8.

FIG. 9 is an S parameter simulation result of the antenna structure shown in FIG. 8. FIG. 10 is an efficiency simulation result of the antenna structure shown in FIG. 8; FIG. 11 is an ECC simulation result of the antenna structure shown in FIG. 8.

As shown in FIG. 9, an operating frequency band of an antenna may cover an N78 frequency band (3.3 GHz to 3.8 GHz) in 5G, and isolation between antennas is greater than 16 dB in the operating frequency band. As shown in FIG. 10 and FIG. 11, system efficiency of an antenna in an operating frequency band can approximately meet −3 dB, and an ECC is less than 0.15 in the operating frequency band. This result is applicable to a MIMO system.

It should be understood that, in an extension design, if the first decoupling member changes from straight-line-shaped to polyline-shaped, radiation performance of the antenna structure in an operating frequency band can be further improved. At the same time, the structural design can improve a design freedom of the first decoupling member in two-dimensional space.

The simulation results show that antenna decoupling can improve isolation in a frequency band by using a straight-line or C-shaped first decoupling member to generate an isolation peak. However, because two open ends of the C-shaped first decoupling member are far away from the first radiator and the second radiator of the antenna, impedance matching of the antenna in an operating frequency band is good. Therefore, the antenna also has high radiation efficiency in the operating frequency band.

Figure 12:
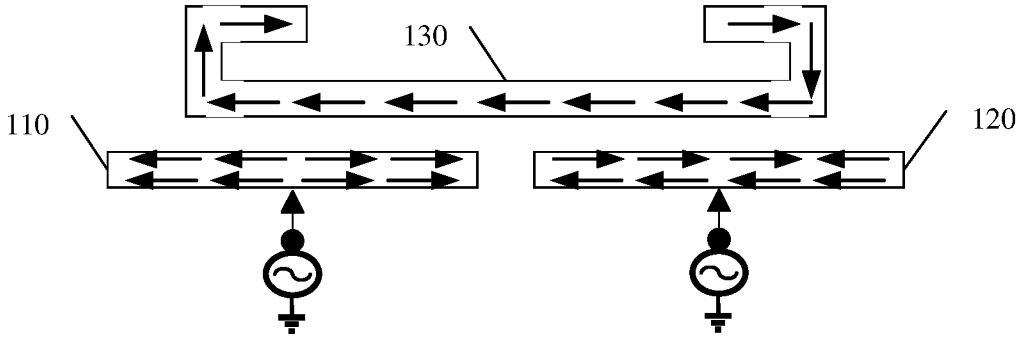
FIG. 12 is a distribution diagram of currents when a first feed unit provides feeding.
Figure 13:
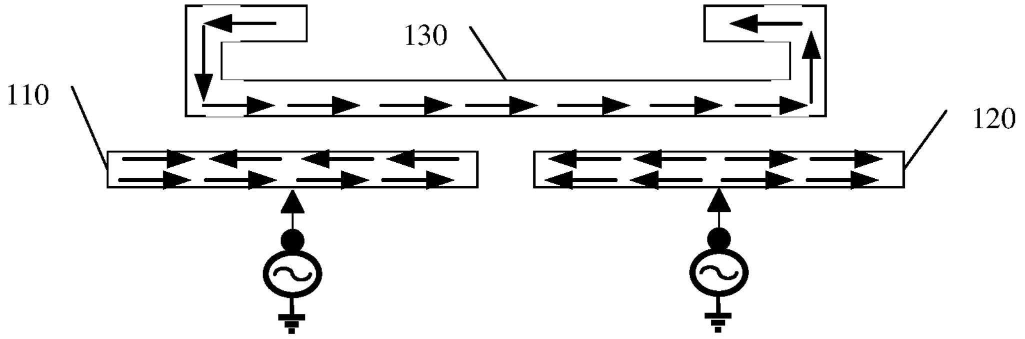
FIG. 13 is a distribution diagram of currents when a second feed unit provides feeding.

FIG. 12 and FIG. 13 are each a schematic diagram of current distribution according to an embodiment of this application. FIG. 12 is a distribution diagram of currents when a first feed unit provides feeding. FIG. 13 is a distribution diagram of currents when a second feed unit provides feeding.

If the first decoupling member 130 is not additionally disposed in an antenna structure, when a first feed unit provides feeding and a first antenna is excited, a strong ground surface current is guided to the second radiator 120. That is, there is strong current coupling between a first feed point and a second feed point, so that isolation between the first antenna and a second antenna deteriorates. On the contrary, if the first decoupling member 130 is additionally disposed in an antenna structure, a strong surface current is bound to the first decoupling member 130, as shown in FIG. 12. In addition, the second radiator 120 has a small surface current, which effectively reduces current coupling between the first feed point and the second feed point, so that the first antenna and the second antenna achieve high near-field isolation. In addition, when the first decoupling member 130 is not additionally disposed in the antenna structure, directions of currents on the first radiator 110 and the second radiator 120 are symmetrical. When the first decoupling member 130 is additionally deposed in the antenna structure, directions of some currents on the first radiator 110 and the second radiator 120 are asymmetric, to offset a current coupled from the first feed point of the first antenna to the second feed point of the second antenna. This improves isolation between the first antenna and the second antenna. It should be understood that, a current that is generated on a surface of the second radiator 120 and that is symmetrical to a current on the first radiator 110 in direction is a first induced current coupled by the first radiator 110 to the second radiator 120. A current that is generated on the surface of the second radiator 120 and that is asymmetrical to the current on the first radiator 110 in direction is a second induced current coupled by the first decoupling member 130 to the second radiator 120. The direction of the induced current generated by the first radiator 110 on the second radiator 120 is opposite to the direction of the induced current generated by the first decoupling member 130 on the second radiator 120, and the induced currents offset each other. This improves isolation between the first antenna and the second antenna.

As shown in FIG. 13, when a feed unit provides feeding at a second feed point and a second antenna is excited, a similar case is observed for a surface current, so that a first antenna and the second antenna also achieve high near-field isolation. Therefore, the first decoupling member 130 coupled between the first antenna and the second antenna may be considered as a decoupling structure in an antenna structure, so that the antennas achieve low coupling. It should be understood that, a current that is generated on a surface of the first radiator 110 and that is symmetrical to a current on the second radiator 120 in direction is a third induced current coupled by the second radiator 120 to the first radiator 110. A current that is generated on the surface of the first radiator 110 and that is asymmetrical to the current on the second radiator 120 in direction is a fourth induced current coupled by the decoupling member 130 to the first radiator 110. The direction of the induced current generated by the second radiator 120 on the first radiator 110 is opposite to the direction of the induced current generated by the decoupling member 130 on the first radiator 110, and the induced currents offset each other. This improves isolation between the first antenna and the second antenna.

Figure 14:
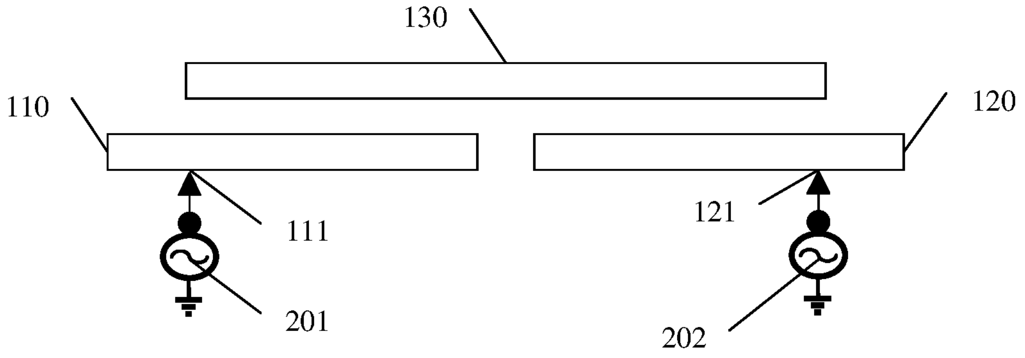
FIG. 14 is a schematic diagram of yet another antenna structure according to an embodiment of this application.

FIG. 14 is a schematic diagram of yet another antenna structure according to an embodiment of this application.

As shown in FIG. 8, the feed point may be disposed in a central region of the radiator, so that a resonance generated by the antenna is in a CM mode, and an operating frequency band of the antenna can only be a single frequency band. FIG. 14 shows yet another antenna structure according to this application. A feed point may be disposed in a region that deviates from a central region of a radiator, so that resonances generated by the antenna are in a CM mode and a differential mode (differential-mode, DM) mode. In other words, two resonances may be generated on a single radiator, so that an operating frequency band of the antenna equivalent to dual frequency bands.

Optionally, a distance D1 between the first radiator 110 and the second radiator 120 may be 5 mm, that is, a width of a first gap is 5 mm. A coupling gap D2 between the first decoupling member 130 and each of the first radiator 110 and the second radiator 120 in a horizontal direction may be 1.5 mm.

FIG. 15 to FIG. 18 are schematic diagrams of simulation results of the antenna structure shown in FIG. 14.

Figure 15:
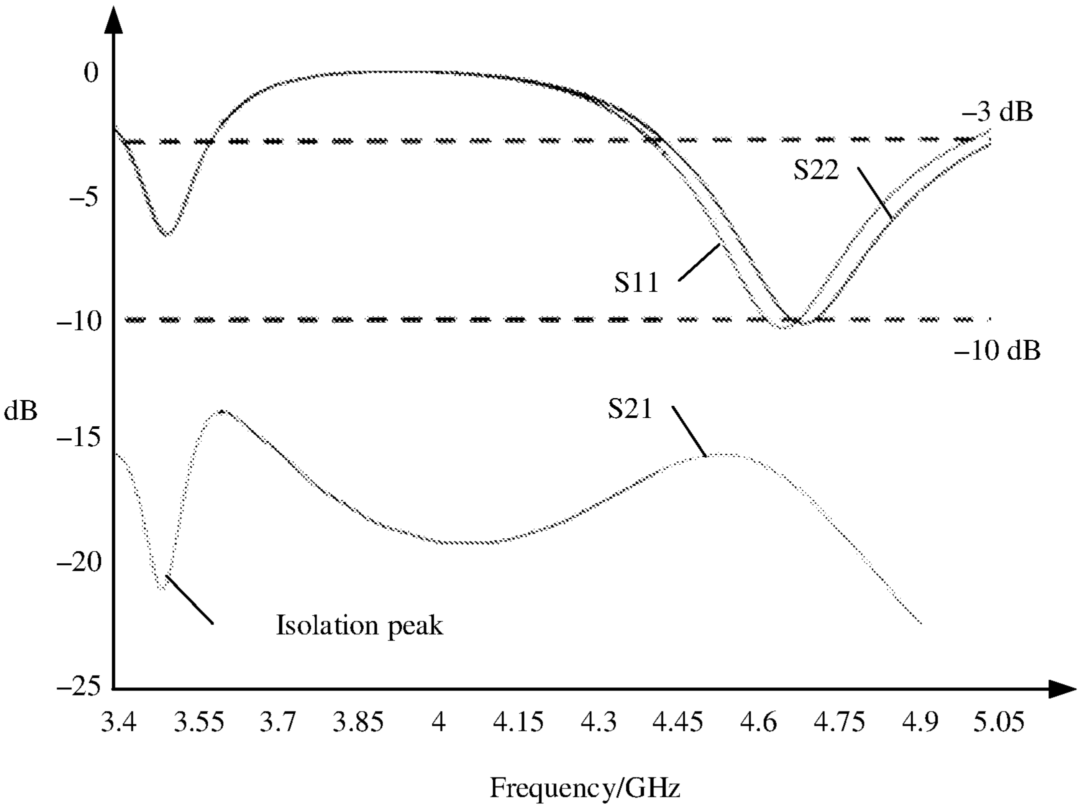
FIG. 15 is an S parameter simulation result of the antenna structure shown in FIG. 14.
Figure 16:
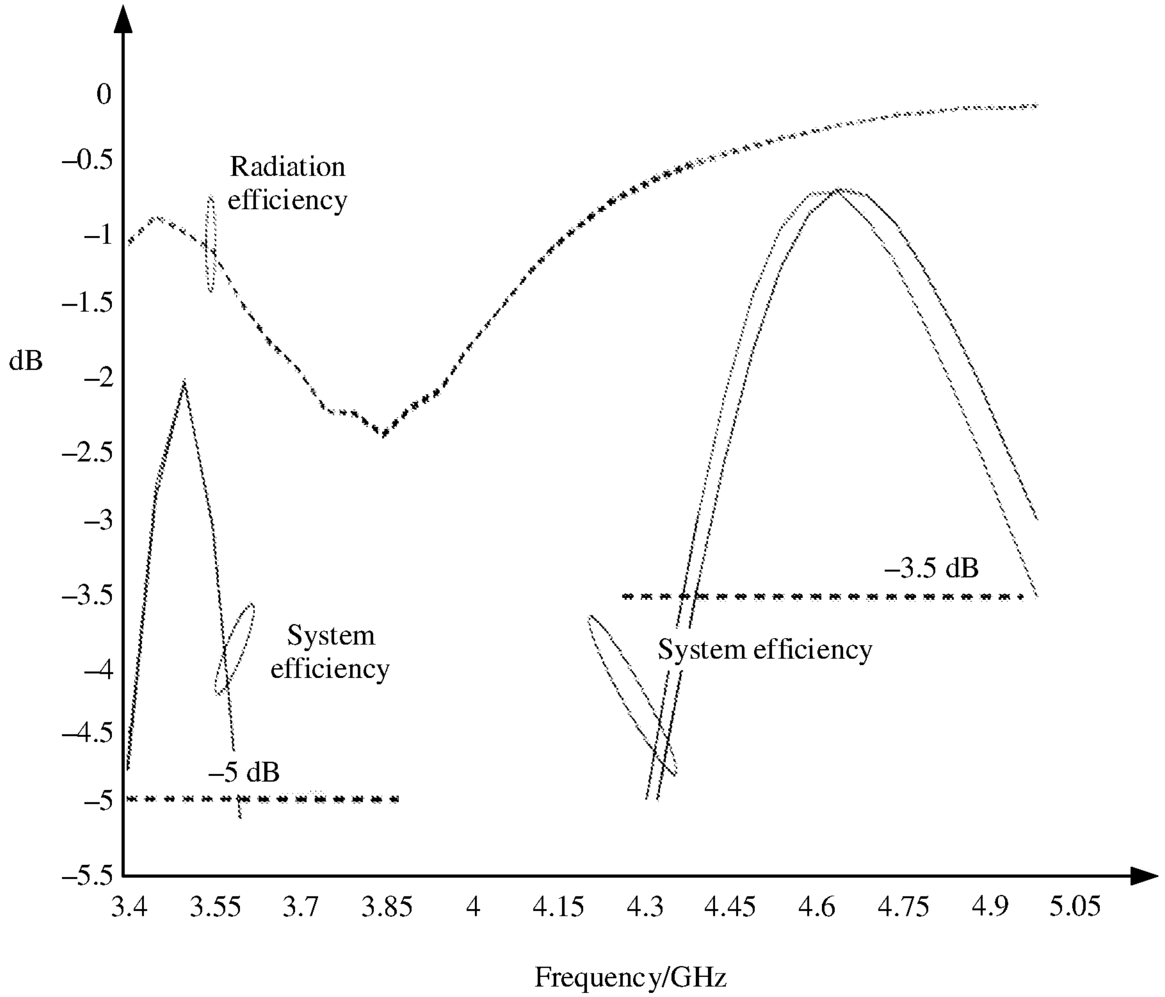
FIG. 16 is an efficiency simulation result of the antenna structure shown in FIG. 14.
Figure 17:
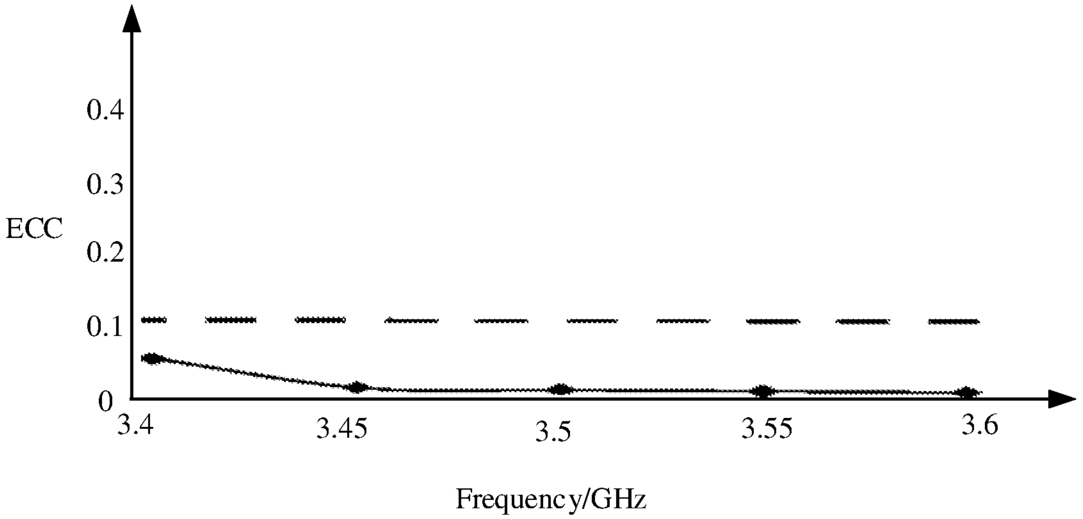
FIG. 17 is an ECC simulation result of the antenna structure shown in FIG. 14 at 3.4 GHz to 3.6 GHz.
Figure 18:
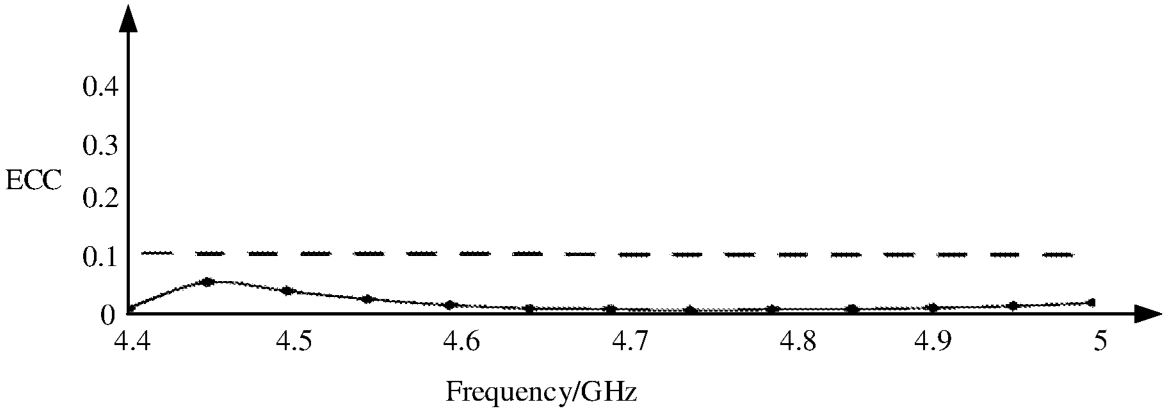
FIG. 18 is an ECC simulation result of the antenna structure shown in FIG. 14 at 4.4 GHz to 5 GHz.

FIG. 15 is an S parameter simulation result of the antenna structure shown in FIG. 14. FIG. 16 is an efficiency simulation result of the antenna structure shown in FIG. 14. FIG. 17 is an ECC simulation result of the antenna structure shown in FIG. 14 at 3.4 GHz to 3.6 GHz. FIG. 18 is an ECC simulation result of the antenna structure shown in FIG. 14 at 4.4 GHz to 5 GHz.

As shown in FIG. 15, an operating frequency band of an antenna may cover 3.4 GHz to 3.6 GHz and 4.4 GHz to 5 GHz in 5G, and isolation between antennas is greater than 13 dB in the operating frequency band. As shown in FIG. 16 to FIG. 18, system efficiency of an antenna in a frequency band from 3.4 GHz to 3.6 GHz can approximately meet −5 dB, system efficiency in a frequency band from 4.4 GHz to 5 GHz can approximately meet −3.5 dB, and an ECC is less than 0.1 in both frequency bands. This result is applicable to a MIMO system.

It should be understood that, in the technical solution provided in this application, when two single-band or dual-band antennas are close to each other, a decoupling member may be coupled between the two antennas. The decoupling member may be considered as a decoupling structure built in the two antennas, so that isolation can be greatly improved in an operating frequency band. This improves antenna efficiency and achieves good antenna performance.

Figure 19:
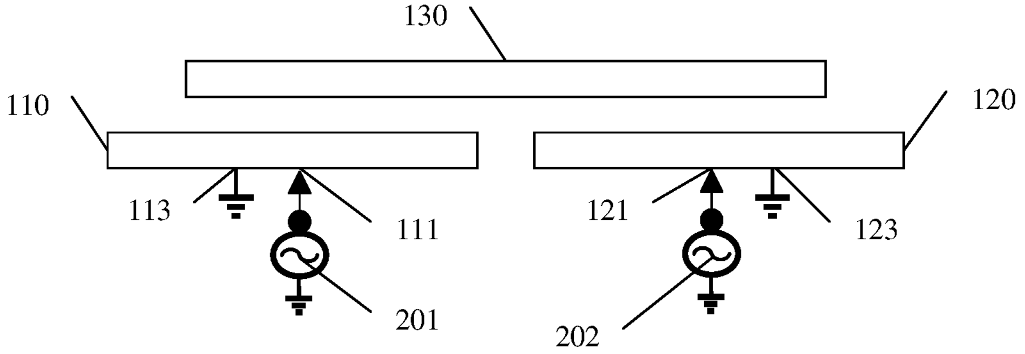
FIG. 19 is a schematic diagram of still yet another antenna structure according to an embodiment of this application.

FIG. 19 is a schematic diagram of still yet another antenna structure according to an embodiment of this application.

It should be understood that the technical solution provided in this embodiment of this application may also be applicable to a case in which a radiator includes a ground point.

As shown in FIG. 19, the first radiator 110 may include a first ground point 113, and the first ground point 113 may be disposed between the first feed point 111 and an end that is of the first radiator 110 and that is away from the first gap. The second radiator 120 may include a second ground point 123, and the second ground point 123 may be disposed between the second feed point 121 and an end that is of the second radiator 120 and that is away from the first gap.

It should be understood that a ground point is disposed between a feed point on a radiator and an end away from a gap. After the radiator is grounded at the ground point, two resonances generated by a CM mode and a DM mode on a same radiator may be close to each other. Therefore, an operating bandwidth of an antenna at a single frequency can be expanded, to implement a broadband antenna.

Figure 20:
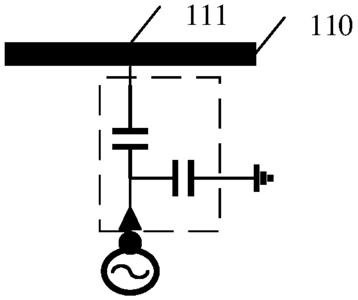
FIG. 20 is a schematic diagram of a matching network according to an embodiment of this application.

FIG. 20 is a schematic diagram of a matching network according to an embodiment of this application.

Optionally, the matching network may be disposed at the first feed point 11 of a first radiator. In this embodiment provided in this application, the first feed point is used as an example for description. Alternatively, the matching network may be disposed at a second feed point of a second radiator.

Matching with a feed unit is added at each feed point, so that a current in another frequency band at the feed point can be suppressed, and overall performance of an antenna is improved.

Optionally, as shown in FIG. 20, a first feed network may include a first capacitor connected in series and a second capacitor connected in parallel, and capacitance values of the first capacitor and the second capacitor may be successively 1 pF and 0.5 pF. It should be understood that a specific form of the matching network is not limited in this application, and the matching network may alternatively be a series capacitor and a parallel inductor.

Figure 21:
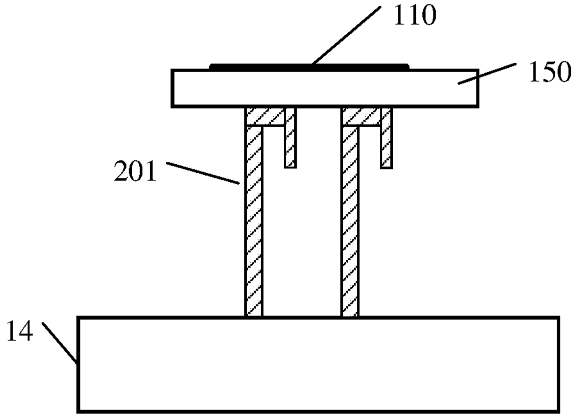
FIG. 21 is a schematic diagram of a structure of an antenna feeding solution according to an embodiment of this application.

FIG. 21 is a schematic diagram of a structure of an antenna feeding solution according to an embodiment of this application.

As shown in FIG. 21, a feed unit of an electronic device may be disposed on the PCB 14, and is electrically connected to a first feed point of a first radiator or a second feed point of a second radiator through a spring plate 201.

Optionally, the first radiator and the second radiator may be disposed on the antenna support 150, and are electrically connected to the feed unit on the PCB 14 through the spring plate 201. The spring plate 201 may be any one of the first metal spring plate and the second metal spring plate in the foregoing embodiments.

It should be understood that the technical solution provided in this embodiment of this application may be further applied to a grounding antenna structure, where an antenna is connected to a ground plane through a spring plate. In the electronic device, the ground plane may be a middle frame or a PCB. The PCB is formed by press-fitting a plurality of layers of dielectric plates, and a metal plating layer exists in the plurality of dielectric plates, and may be used as a reference ground of the antenna.

Figure 22:
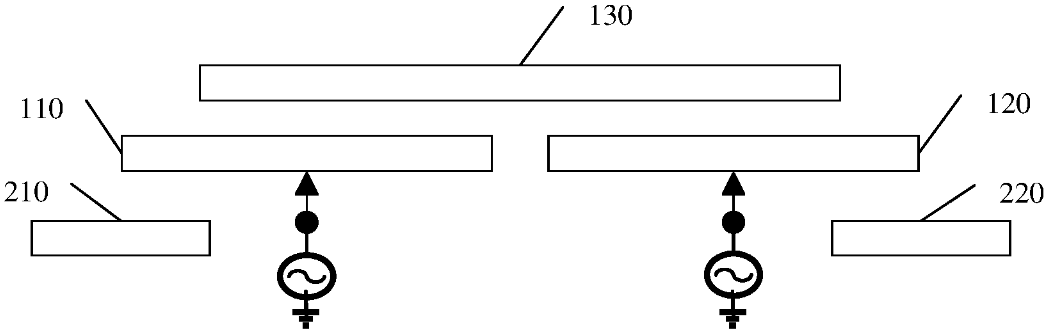
FIG. 22 is a schematic diagram of a further antenna structure according to an embodiment of this application.
Figure 23:
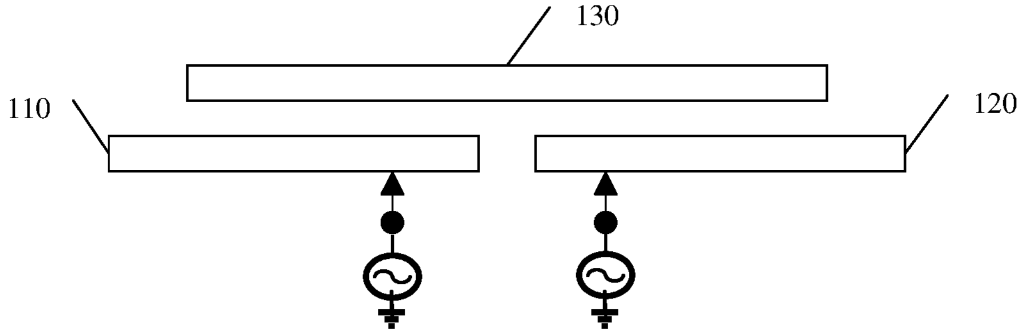
FIG. 23 is a schematic diagram of a still further antenna structure according to an embodiment of this application.

FIG. 22 and FIG. 23 are each a schematic diagram of a further antenna structure according to an embodiment of this application.

As shown in FIG. 22, the antenna may further include a first parasitic stub 210 and a second parasitic stub 220. The first parasitic stub 210 may be disposed on one side of the first radiator 110, and may be coupled and fed through the first radiator 120. The second parasitic stub 220 may be disposed on one side of the second radiator 120, and may be coupled and fed through the second radiator 120.

Optionally, the first feed point may be disposed in a central region of the first radiator, and the second feed point may be disposed in a central region of the second radiator. In this case, a first antenna formed by the first radiator and a second antenna formed by the second radiator may generate a resonance in a CM mode.

Optionally, a feed unit may provide feeding in an indirect coupling manner or a direct coupling manner.

Optionally, the first parasitic stub 210 may be disposed on an antenna support, a rear cover of an electronic device, or a PCB of the electronic device.

Optionally, the second parasitic stub 220 may be disposed on an antenna support, a rear cover of an electronic device, or a PCB of the electronic device.

Optionally, a length of the first parasitic stub 210 may be a half of an operating wavelength.

Optionally, a length of the second parasitic stub 220 may be a half of an operating wavelength.

Optionally, an end of the first parasitic stub 210 may be grounded. After the first parasitic stub 210 is grounded, a length of the first parasitic stub 210 may be shortened to a quarter of an operating wavelength.

Optionally, an end of the second parasitic stub 220 may be grounded. After the second parasitic stub 220 is grounded, a length of the second parasitic stub 220 may be shortened to a quarter of an operating wavelength.

As shown in FIG. 23, a first feed point may be disposed at an end that is of the first radiator and that is close to a first gap, and the second feed point may be disposed at an end that is of the second radiator and that is close to the first gap. In this case, a first antenna formed by the first radiator and a second antenna formed by the second radiator may generate a resonance in a DM mode.

Figure 24:
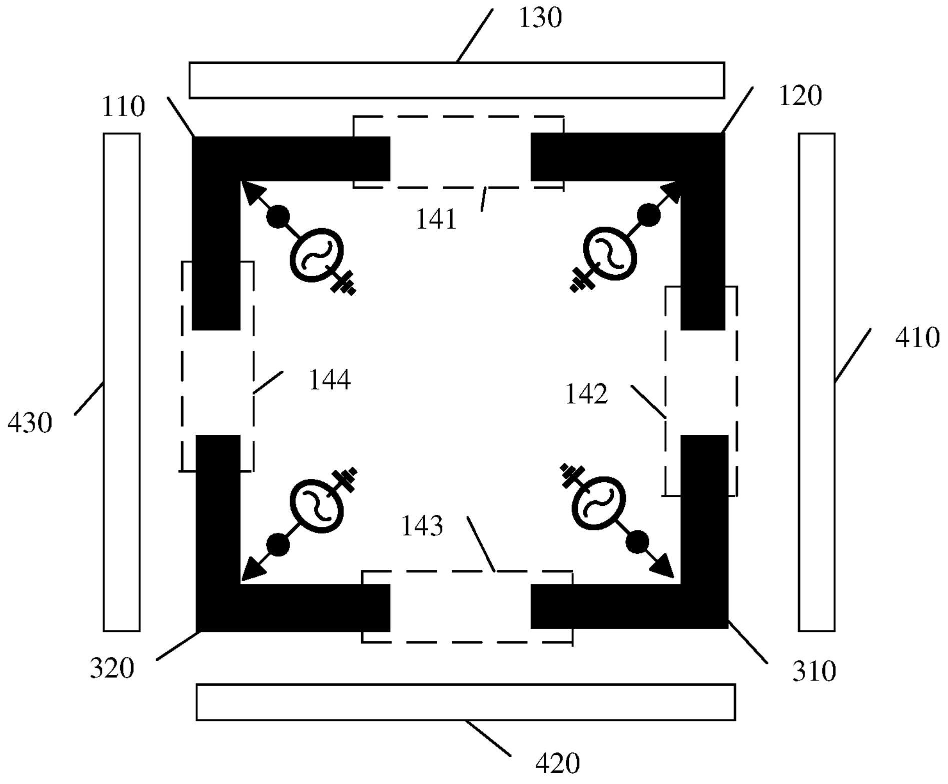
FIG. 24 is a schematic diagram of a structure of an antenna array according to an embodiment of this application.

FIG. 24 is a schematic diagram of a structure of a four-unit array formed by antennas according to an embodiment of this application.

As shown in FIG. 24, the antenna may include a first radiator 110, a second radiator 120, a third radiator 310, a fourth radiator 320, a first decoupling member 130, a second decoupling member 410, a third decoupling member 420, and a fourth decoupling member 430.

A first gap 141 is formed between the first radiator 110 and the second radiator 120, a second gap 142 is formed between the second radiator 120 and the third radiator 310, a third gap 143 is formed between the third radiator 310 and the fourth radiator 320, and a fourth gap 144 is formed between the fourth radiator 320 and the first radiator 110.

The first decoupling member 130, the second decoupling member 410, the third decoupling member 420, and the fourth decoupling member 430 are disposed on an outer side of a region enclosed by a first projection, a second projection, a third projection, and a fourth projection. The third projection is a projection of the third radiator on the rear cover in a first direction, and the fourth projection is a projection of the fourth radiator on the rear cover in the first direction. It should be understood that the first decoupling member 130, the second decoupling member 410, the third decoupling member 420, and the fourth decoupling member 430 do not overlap the first projection, the second projection, the third projection, and the fourth projection.

Optionally, the first radiator may include a first feed point that may be disposed in a central region of the first radiator. The first feed unit may feed at the first feed point.

Optionally, the second radiator may include a second feed point that may be disposed in a central region of the second radiator. The second feed unit may feed at the second feed point.

Optionally, the third radiator may include a third feed point that may be disposed in a central region of the third radiator. The third feed unit may feed at the third feed point.

Optionally, the fourth radiator may include a fourth feed point that may be disposed in a central region of the fourth radiator. The fourth feed unit may feed at the fourth feed point.

It should be understood that the first radiator 110, the second radiator 120, the third radiator 310, and the fourth radiator 320 may not include a ground point, to form four monopole antennas that form an antenna array. This meets a requirement of a MIMO system. Alternatively, a matching network may be disposed at the feed point for the first radiator 110, the second radiator 120, the third radiator 310, and the fourth radiator 320 for grounding. If physical ground points are disposed on the first radiator 110, the second radiator 120, the third radiator 310, and the fourth radiator 320, when the antenna array works, current distribution of the antenna array is disordered, and a requirement of the MIMO system cannot be met.

It should be understood that each feed point may also be disposed in a region that is on a corresponding radiator and that deviates from a central region, so that the antenna array can work on two frequency bands. For ease of description, an example in which the antenna array works on a single frequency band is used for description in this embodiment of this application.

Optionally, the first direction may be a direction perpendicular to the first decoupling member 130, the first radiator 110, or the second radiator 120. The second direction may be a direction perpendicular to the second decoupling member 410, the second radiator 120, or the third radiator 310. The third direction may be a direction perpendicular to the third decoupling member 420, the third radiator 310, or the fourth radiator 320. The fourth direction may be a direction perpendicular to the fourth decoupling member 430, the fourth radiator 320, or the first radiator 110.

It should be understood that perpendicularity may mean that the first radiator 110 or the second radiator has an included angle of approximately 90° with a plane in which the first radiator 110 is located.

Optionally, the first decoupling member 130, the second decoupling member 410, the third decoupling member 420, and the fourth decoupling member 430 may be disposed on a surface of a rear cover of an electronic device.

Optionally, the first radiator 110, the second radiator 120, the third radiator 310, and the fourth radiator 320 may be disposed on an antenna support or a PCB surface of an electronic device.

Optionally, the first radiator 110, the second radiator 120, the third radiator 310, and the fourth radiator 320 may be arranged in a form of a 2×2 array.

Optionally, distances among the first radiator 110, the second radiator 120, the third radiator 310, and the fourth radiator 320 may be 9.5 mm, that is, widths of the first gap 141, the second gap 142, the third gap 143, and the fourth gap 144 may be 9.5 mm.

Optionally, lengths of the first decoupling member 130, the second decoupling member 410, the third decoupling member 420, and the fourth decoupling member 430 may be half of a wavelength corresponding to a resonance point of a resonance generated by the antenna, and may be 45 mm. Lengths of the first decoupling member 130, the second decoupling member 410, the third decoupling member 420, and the fourth decoupling member 430 may be 35 mm.

Optionally, corresponding coupling gaps among the first decoupling member 130, the second decoupling member 410, the third decoupling member 420, and the fourth decoupling member 430 and the first radiator 110, the second radiator 120, the third radiator 310, and the fourth radiator 320 may be 2 mm.

Optionally, the first decoupling member 130, the second decoupling member 410, the third decoupling member 420, and the fourth decoupling member 430 may be polyline-shaped, for example, C-shaped or U-shaped.

Figure 25:
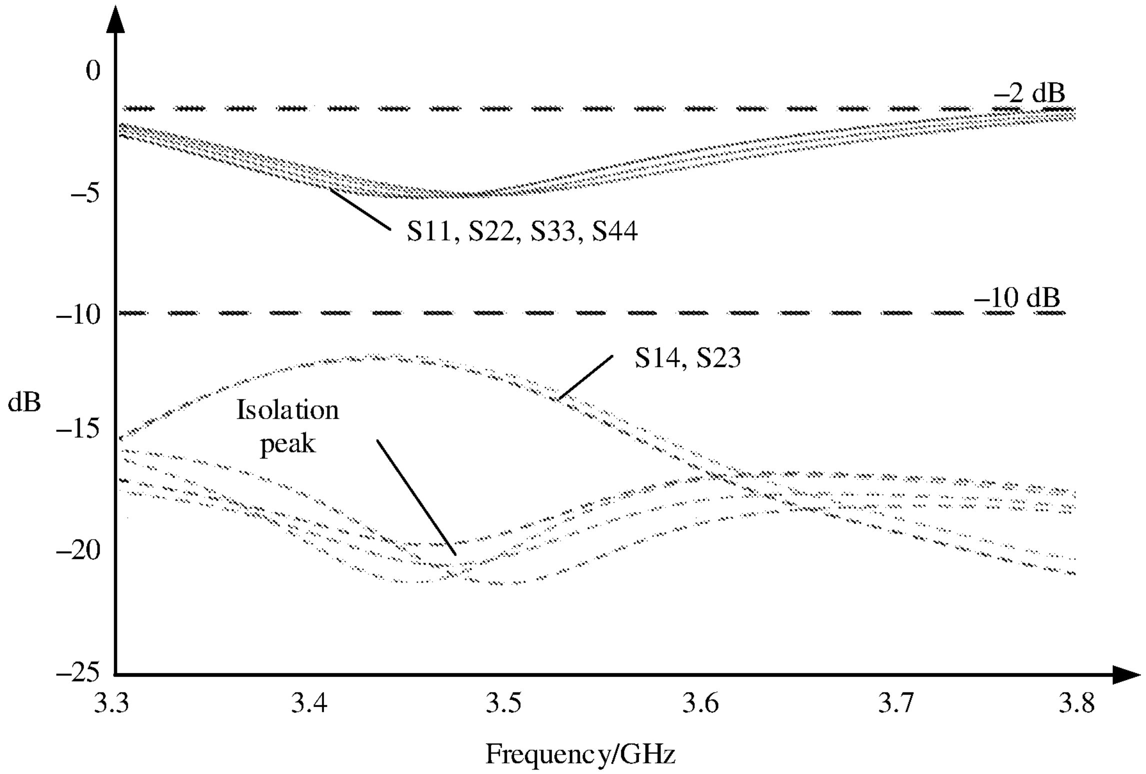
FIG. 25 is an S parameter simulation result of the antenna structure shown in FIG. 24.
Figure 26:
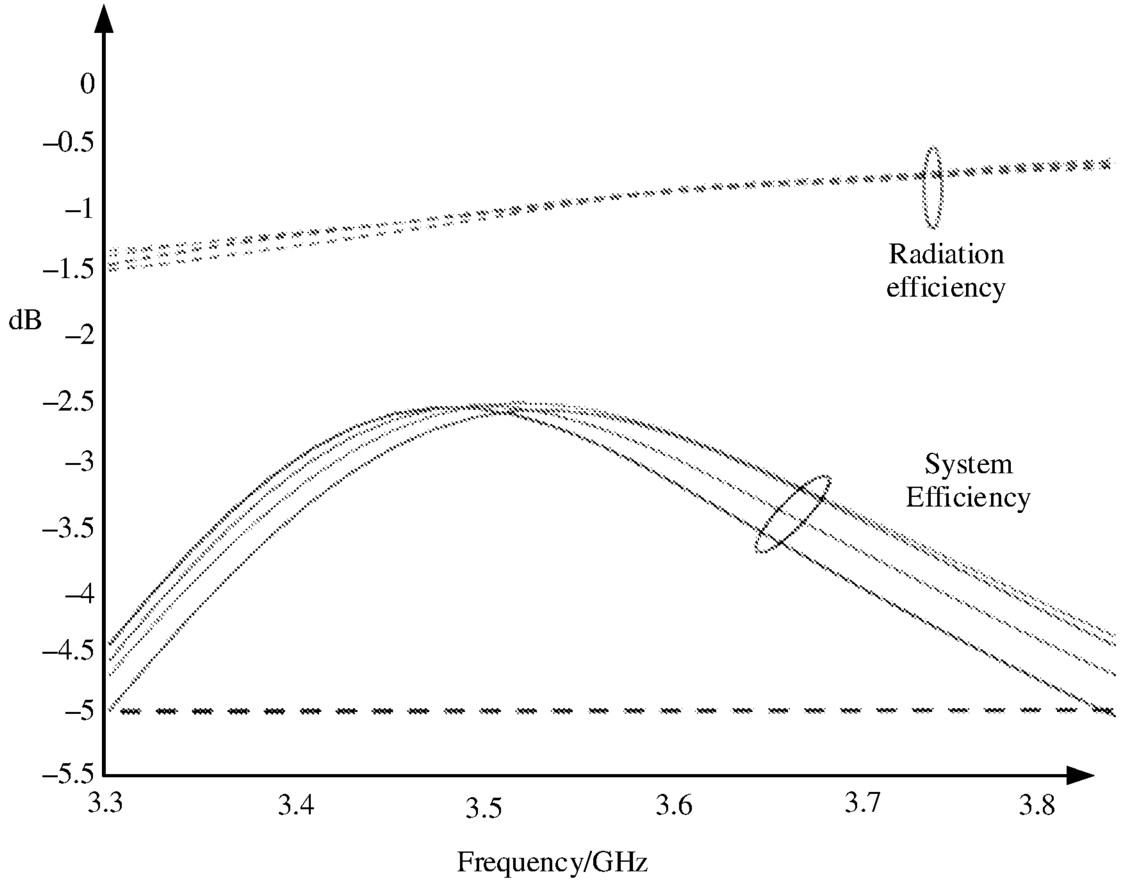
FIG. 26 is an efficiency simulation result of the antenna structure shown in FIG. 24.
Figure 27:
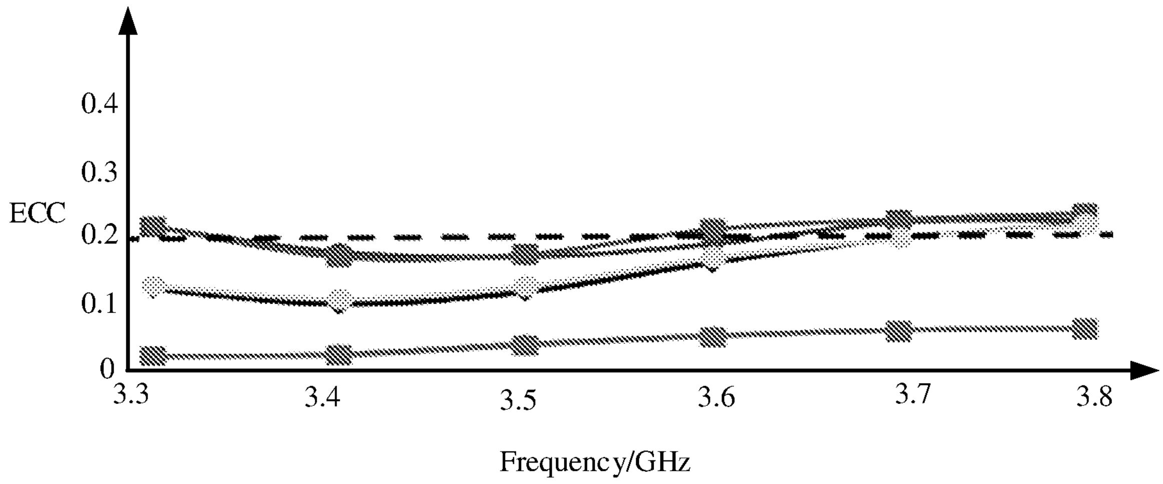
FIG. 27 is an ECC simulation result of the antenna structure shown in FIG. 24.

FIG. 25 to FIG. 27 are schematic diagrams of simulation results of the antenna structure shown in FIG. 24.

FIG. 25 is an S parameter simulation result of the antenna structure shown in FIG. 24. FIG. 26 is an efficiency simulation result of the antenna structure shown in FIG. 24. FIG. 27 is an ECC simulation result of the antenna structure shown in FIG. 24.

As shown in FIG. 25, an operating bandwidth of a four-unit antenna array may cover 3.3 GHz to 3.8 GHz, and isolation in an operating frequency band is greater than 11.7 dB. As shown in FIG. 26 and FIG. 27, system efficiency of a four-unit antenna array in a frequency band from 3.3 GHz to 3.8 GHz approximately meets −5 dB, and an ECC is less than 0.24 in the frequency band from 3.3 GHz to 3.8 GHz. This result is applicable to a 2×2 MIMO system.

Figure 28:
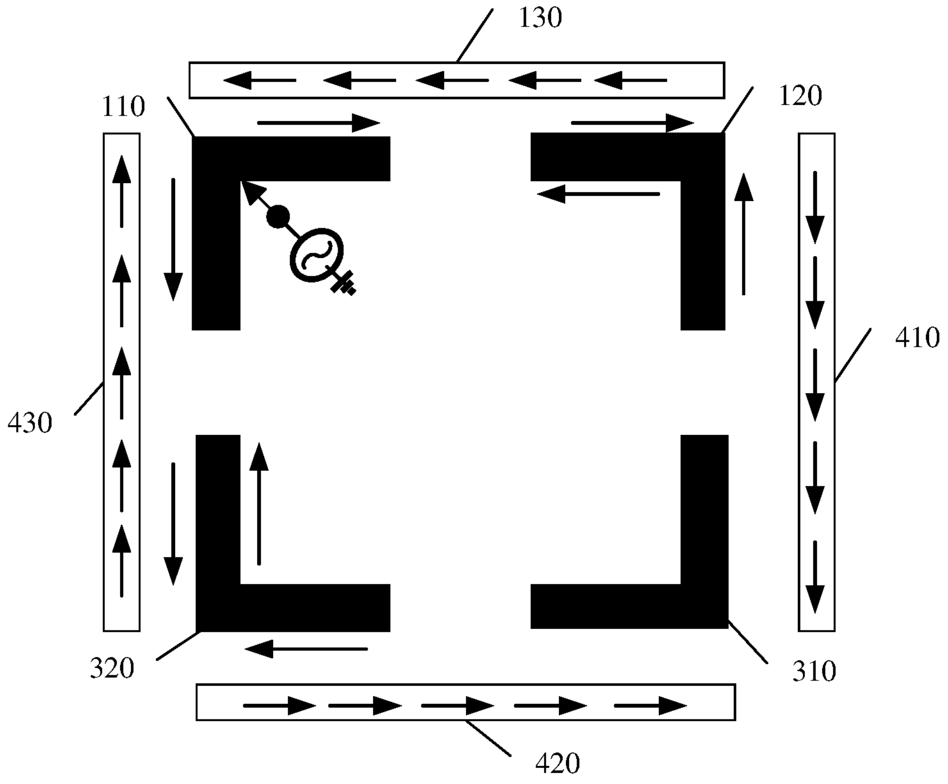
FIG. 28 is a distribution diagram of currents when a first feed unit provides feeding according to an embodiment of this application.

FIG. 28 is a distribution diagram of currents when a first feed unit provides feeding according to an embodiment of this application.

As shown in FIG. 28, when the first feed unit provides feeding, a strong ground surface current is guided to a second radiator, a third radiator, and a fourth radiator. In other words, there is a strong coupling current between feed points of an antenna array, so that near-field isolation of the antenna array deteriorates. However, after the antenna array is coupled to a plurality of decoupling members, the second radiator, the third radiator, and the fourth radiator of the antenna array may generate induced currents by corresponding decoupling members. Directions of the induced currents are opposite to a direction of the coupling current. In other words, this structure may offset coupling currents coupled from the first feed point to the second feed point, the third feed point, and the fourth feed point, so that the feed points achieve high near-field isolation.

It should be understood that, when feed units corresponding to the second feed point, the third feed point, and the fourth feed point provide feeding, there are similar cases of observing surface currents, so that the feed points also achieve high near-field isolation.

Figure 29:
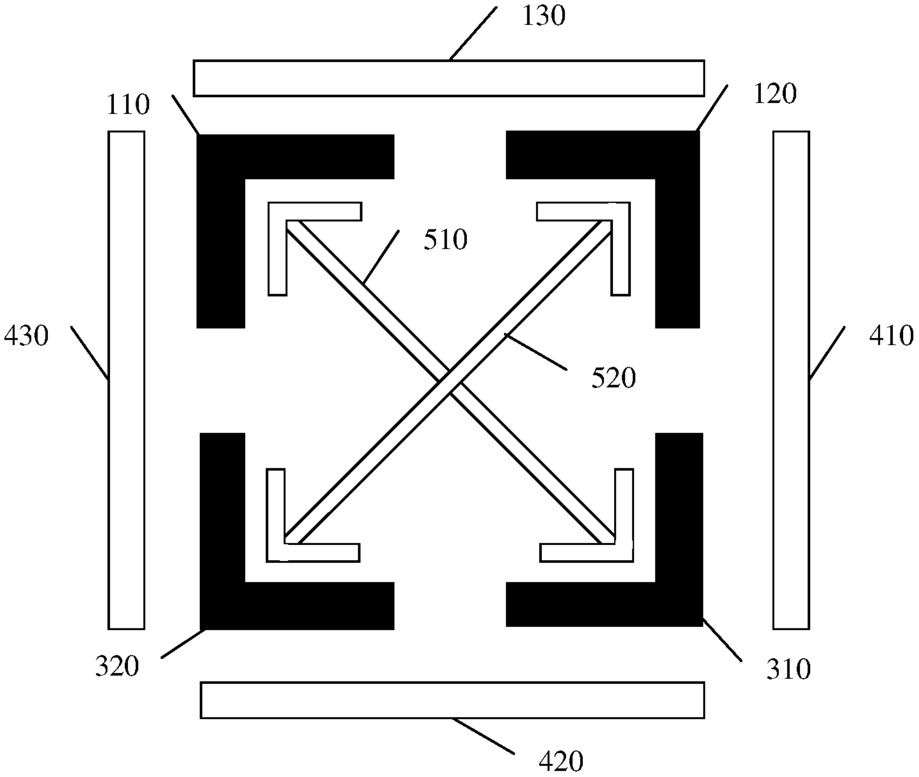
FIG. 29 is a schematic diagram of a structure of an antenna array according to an embodiment of this application.

FIG. 29 is a schematic diagram of a structure of an antenna array according to an embodiment of this application.

As shown in FIG. 29, an antenna may further include a first neutralization member 510 and a second neutralization member 520.

The first neutralization member 510 and the second neutralization member 520 are disposed on an inner side of a region enclosed by a first projection, a second projection, a third projection, and a fourth projection or an inner side of a region enclosed by a first radiator, a second radiator, a third radiator, and a fourth radiator. One end of the first neutralization member 510 is close to the first radiator 110, and the other end is close to the third radiator 310. One end of the second neutralization member 520 is close to the second radiator 120, and the other end is close to the fourth radiator 320.

It should be understood that the first neutralization member 510 and the second neutralization member 520 are disposed on an inner side of a region enclosed by the first radiator 110, the second radiator 120, the third radiator 310, and the fourth radiator 320. It may be considered that the vertical projections of the first neutralization member 510 and the second neutralization member 520 on a plane in which the first radiator 110, the second radiator 120, the third radiator 310, and the fourth radiator 320 are located are on the inner side of the region enclosed by the first radiator 110, the second radiator 120, the third radiator 310 and the fourth radiator 320.

Optionally, the first neutralization member 510 may be disposed on a surface of a rear cover, and the second neutralization member 520 may be disposed on a surface of an antenna support.

Optionally, the first neutralization member 510 may be disposed on a surface of an antenna support, and the second neutralization member 520 may be disposed on a surface of a rear cover.

Optionally, the first neutralization member 510 and the second neutralization member 520 may be disposed on a surface of a rear cover.

Optionally, the first neutralization member 510 and the second neutralization member 520 may be disposed on a surface of an antenna support.

Optionally, the first neutralization member 510 and the second neutralization member 520 may have different coupling spacings with a radiator support. Therefore, if a difference between different coupling spacings is designed, resonance paths of the first neutralization member 510 and the second neutralization member 520 can be effectively separated. This achieves an effect that the first neutralization member 510 and the second neutralization member 520 can be separately configured at different layers.

Figure 30:
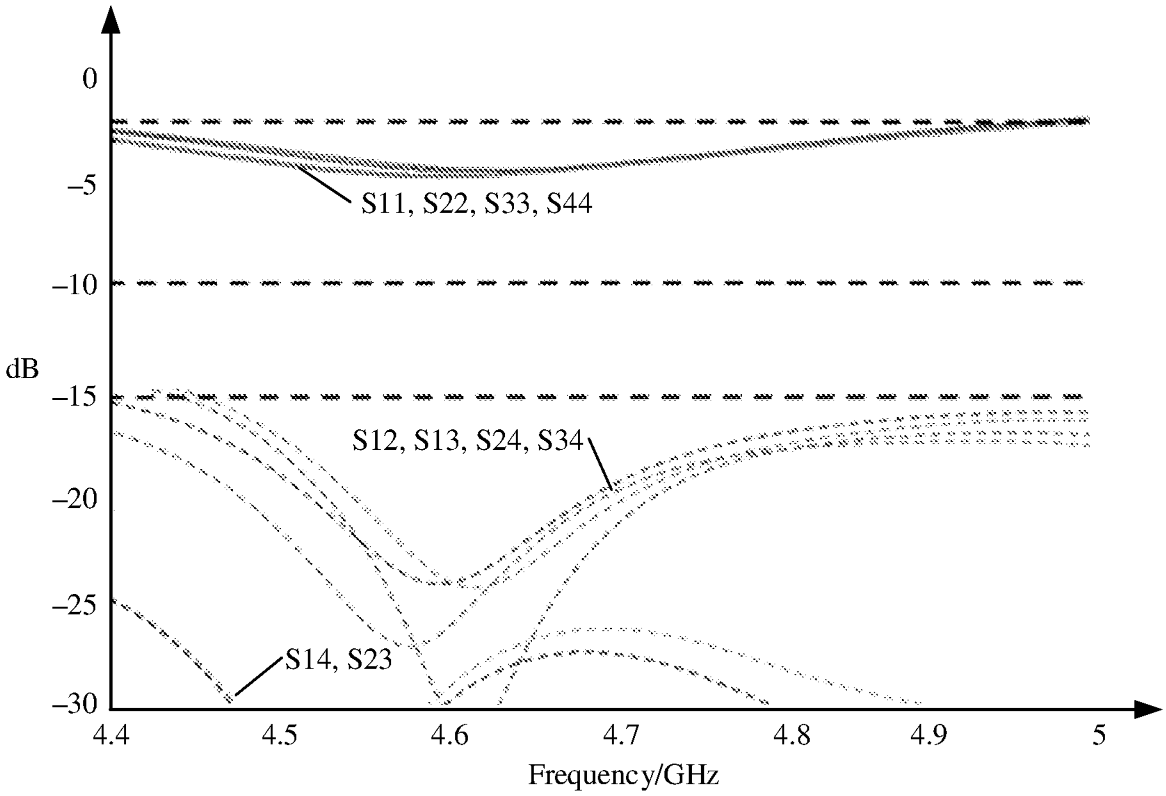
FIG. 30 is an S parameter simulation result of the antenna structure shown in FIG. 29.
Figure 31:
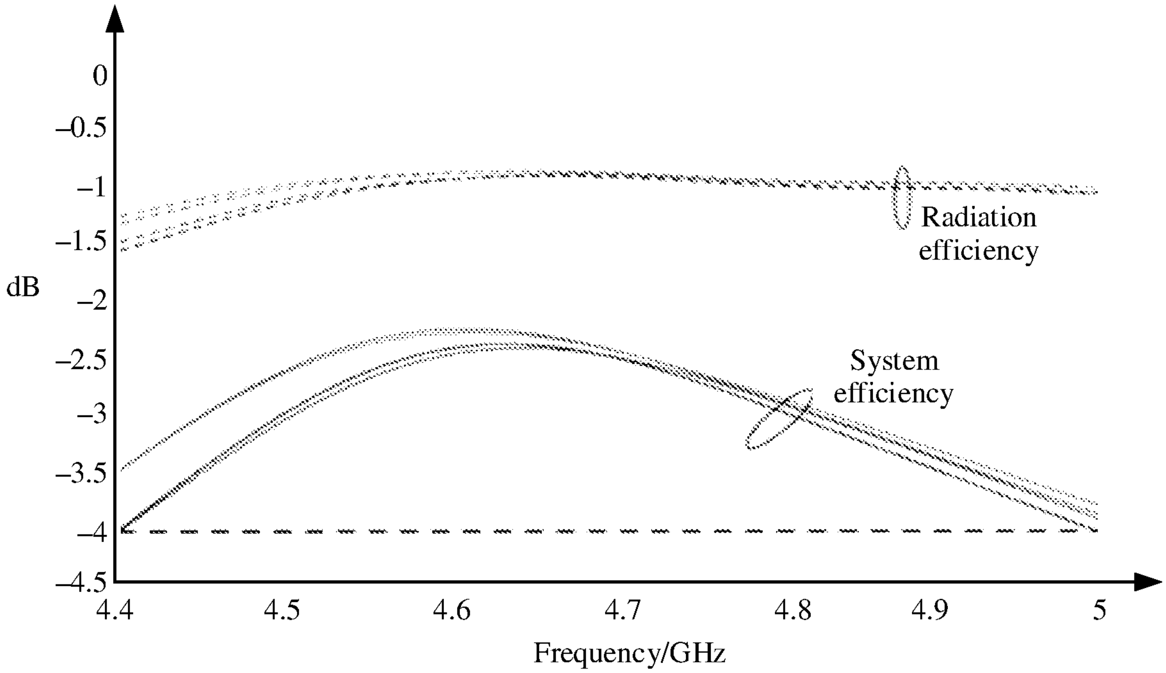
FIG. 31 is an efficiency simulation result of the antenna structure shown in FIG. 29.
Figure 32:
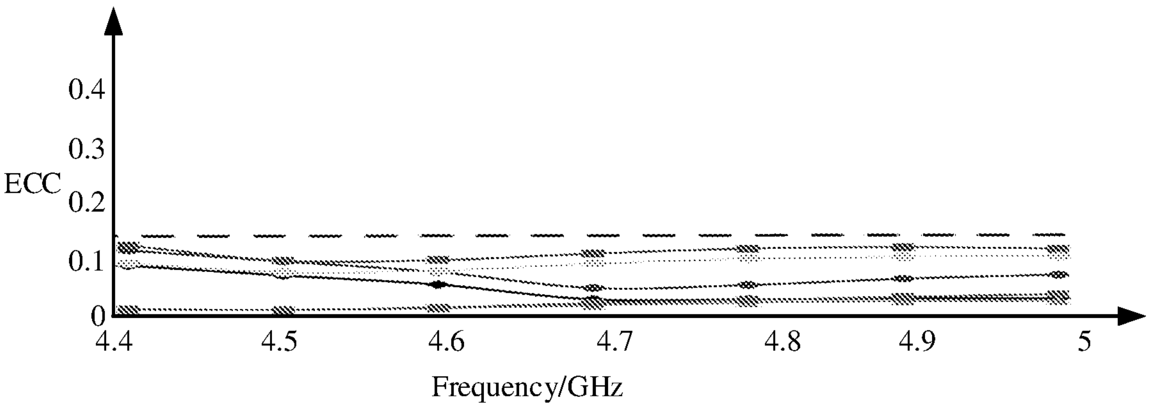
FIG. 32 is an ECC simulation result of the antenna structure shown in FIG. 29.

FIG. 30 to FIG. 32 are schematic diagrams of simulation results of the antenna structure shown in FIG. 29. An example in which the first neutralization member 510 and the second neutralization member 520 are disposed on a surface of a rear cover is used for description.

FIG. 30 is an S parameter simulation result of the antenna structure shown in FIG. 29. FIG. 31 is an efficiency simulation result of the antenna structure shown in FIG. 29. FIG. 32 is an ECC simulation result of the antenna structure shown in FIG. 29.

As shown in FIG. 30, in an operating frequency band, because a neutralization member is additionally disposed, there are six isolation peaks. This effectively improves isolation between a first feed point of the first radiator and a third feed point of the third radiator, and isolation between a second feed point of the second radiator and a fourth feed point of the fourth radiator. An operating bandwidth of a four-unit antenna array may cover 4.4 GHz to 5 GHz, and isolation in an operating frequency band is greater than 14 dB. As shown in FIG. 31 and FIG. 32, system efficiency of a four-unit antenna array in a frequency band of 4.4 GHz to 5 GHz can approximately meet −4 dB, and an ECC is less than 0.13 in the frequency band of 4.4 GHz to 5 GHz. This result is applicable to a 2×2 MIMO system.

Figure 33:
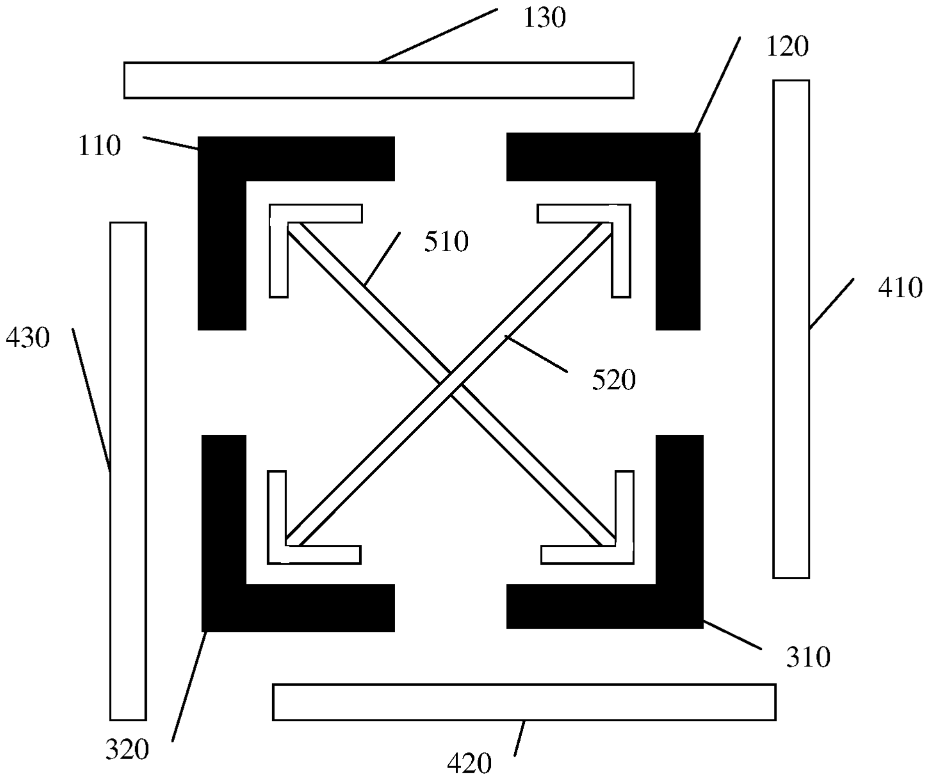
FIG. 33 is a schematic diagram of a structure of another antenna array according to an embodiment of this application.

FIG. 33 is a schematic diagram of a structure of an antenna array according to an embodiment of this application.

As shown in FIG. 33, an antenna structure may be asymmetric. The first decoupling member 130 may be close to a first radiator, the second decoupling member 410 may be close to a second radiator, the third decoupling member 420 may be close to a third radiator, and the fourth decoupling member 430 may be close to a fourth radiator.

It should be understood that symmetry of the structure of the antenna is not limited in this application. A location of a decoupling member may be changed based on a design or production requirement, so that the decoupling member is biased towards one of the radiators.

Figure 34:
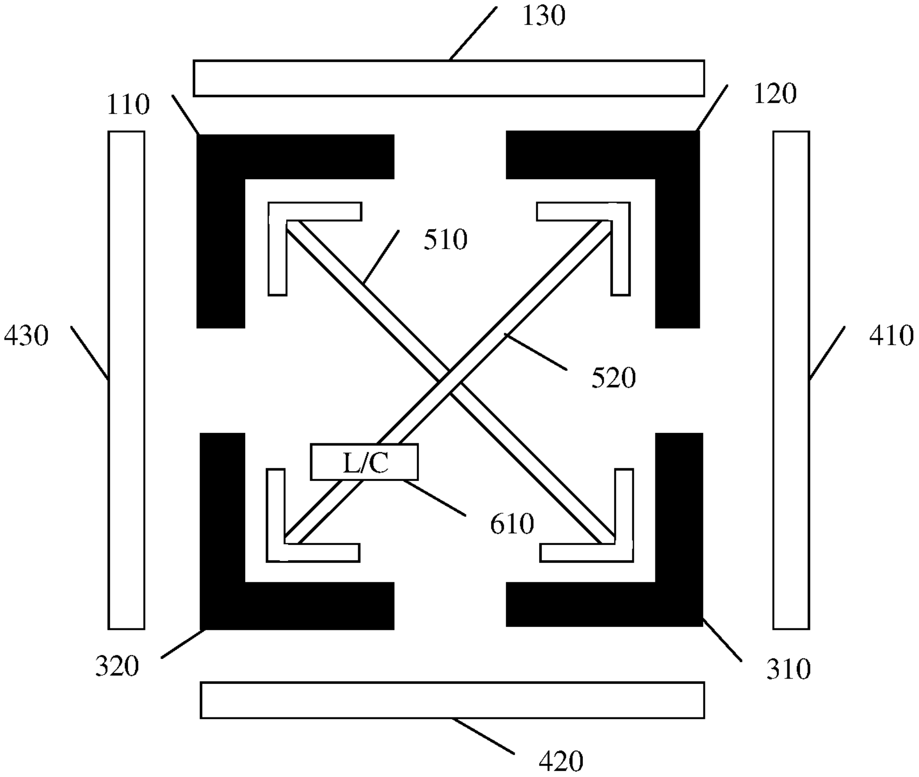
FIG. 34 is a schematic diagram of a structure of still another antenna array according to an embodiment of this application.

FIG. 34 is a schematic diagram of a structure of an antenna array according to an embodiment of this application.

As shown in FIG. 34, the first neutralization member 510 may include a first element 610. The first element 610 may be connected in series to the first neutralization member 510.

Optionally, the first element 610 may be a capacitor, an inductor, or another lumped component. A capacitance or an inductance value of the first element 610 may be adjusted to control a frequency increase/decrease location of an isolation peak between a first feed point and a third feed point.

It should be understood that a same structure may be applied to the second neutralization member 520, and the second neutralization member 520 is configured to control a frequency increase/decrease location of an isolation peak between a second feed point and a fourth feed point.

Figure 35:
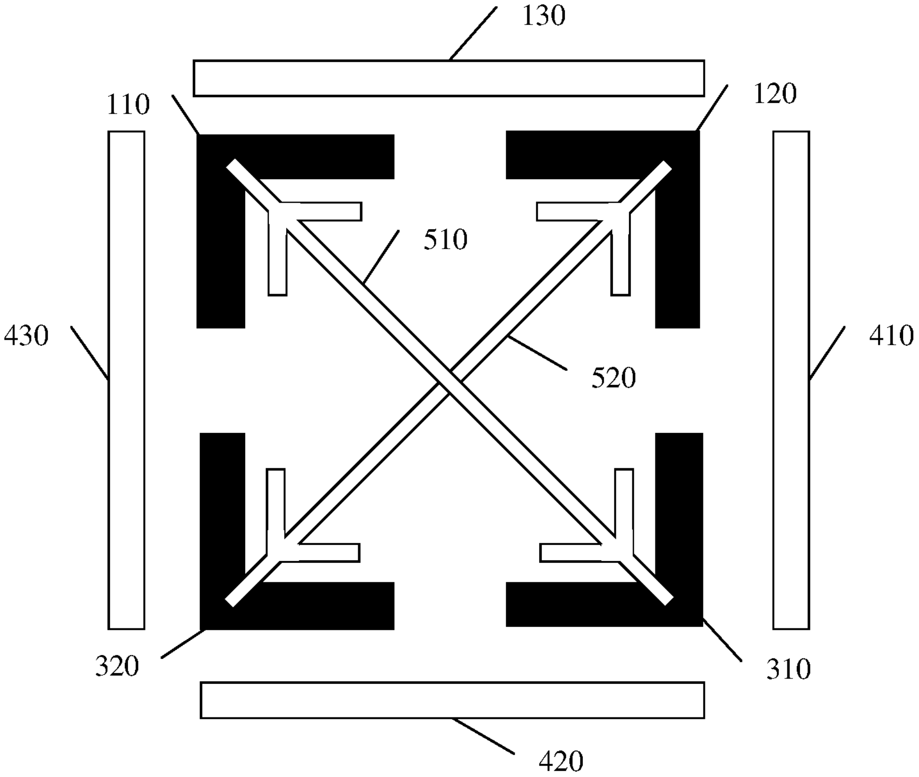
FIG. 35 is a schematic diagram of a structure of yet another antenna array according to an embodiment of this application.

FIG. 35 is a schematic diagram of a structure of an antenna array according to an embodiment of this application.

As shown in FIG. 35, when the first neutralization member 510 and the second neutralization member 520 are disposed on a rear cover of an electronic device, the first neutralization member 510 overlaps a first projection of the first radiator 110 on the rear cover in a first direction and a third projection of the third radiator 310 on the rear cover in the first direction. The second neutralization member 520 overlaps a second projection of the second radiator 120 on the rear cover in the first direction and a fourth projection of the fourth radiator 320 on the rear cover in the first direction.

It should be understood that this structure may further increase coupling strength between the first neutralization member 510 and the first radiator 110 and the third radiator 310, and between the second neutralization member 520 and the second radiator 120 and the fourth radiator 320, reduce a coupling current between a first feed point of the first radiator and a third feed point of the third radiator, and reduce a coupling current between a second feed point of the second radiator and a fourth feed point of the fourth radiator. In this way, isolation is improved.

Figure 36:
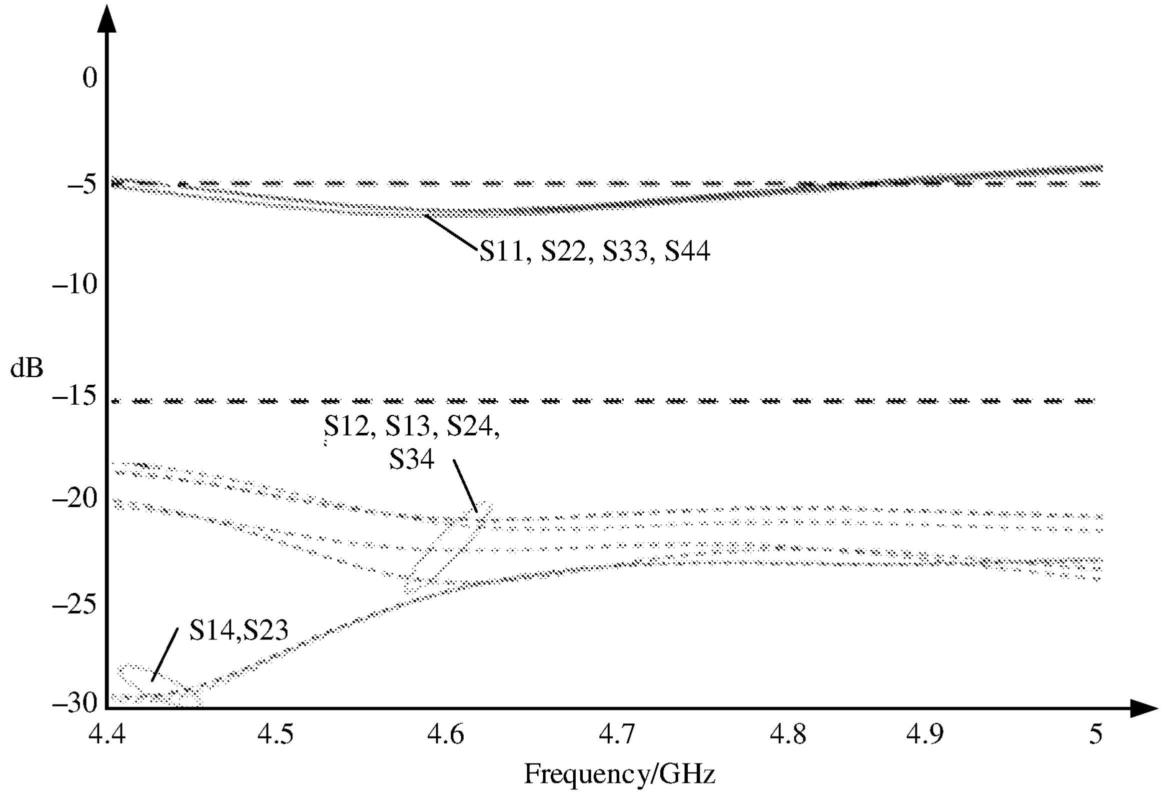
FIG. 36 is an S parameter simulation result of the antenna structure shown in FIG. 35.
Figure 37:
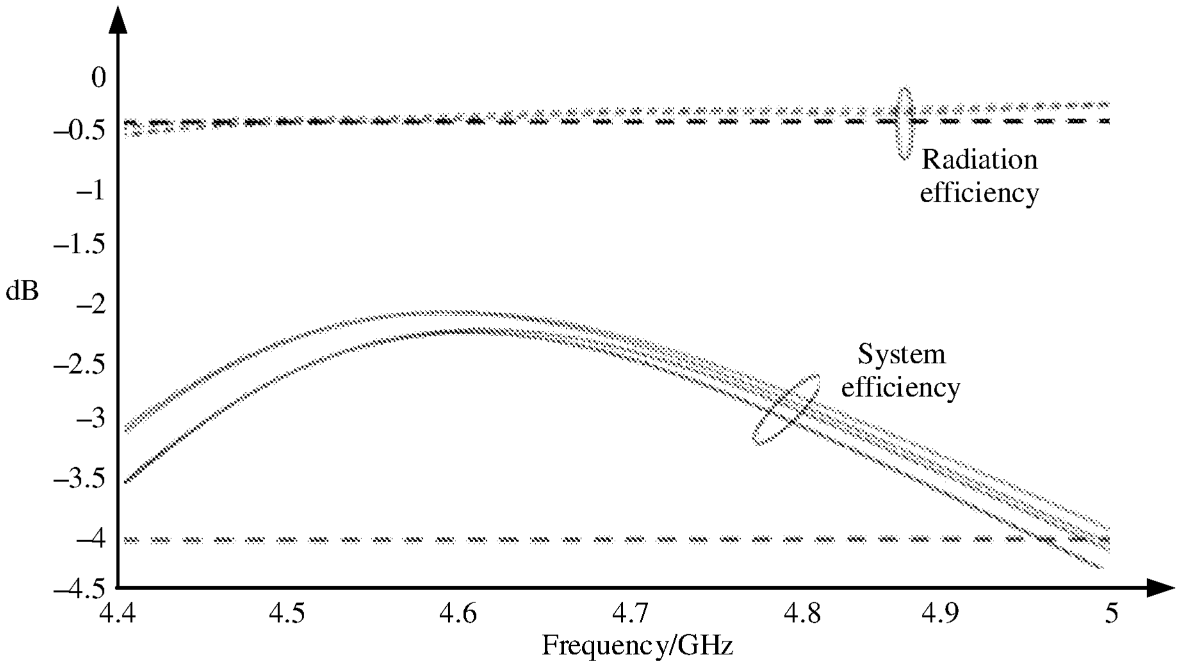
FIG. 37 is an efficiency simulation result of the antenna structure shown in FIG. 35.
Figure 38:
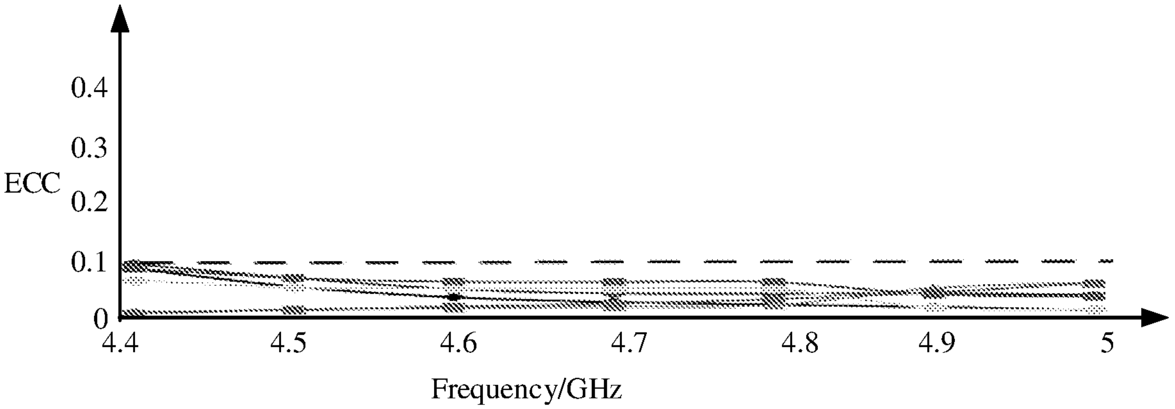
FIG. 38 is an ECC simulation result of the antenna structure shown in FIG. 35.

FIG. 36 to FIG. 38 are schematic diagrams of simulation results of the antenna structure shown in FIG. 35.

FIG. 36 is an S parameter simulation result of the antenna structure shown in FIG. 35. FIG. 37 is an efficiency simulation result of the antenna structure shown in FIG. 35. FIG. 38 is an ECC simulation result of the antenna structure shown in FIG. 35.

As shown in FIG. 36, an operating bandwidth of a four-unit antenna array may cover 4.4 GHz to 5 GHz, and isolation in an operating frequency band is greater than 18 dB. As shown in FIG. 37 and FIG. 38, system efficiency of a four-unit antenna array in a frequency band of 4.4 GHz to 5 GHz can approximately meet −4 dB, and an ECC is less than 0.1 in the frequency band of 4.4 GHz to 5 GHz. This result is applicable to a 2×2 MIMO system.

Figure 39:
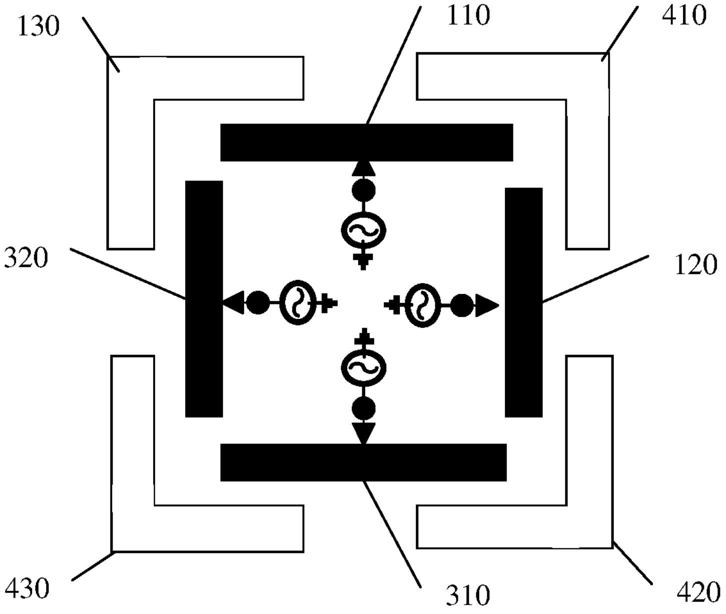
FIG. 39 is a schematic diagram of a structure of still yet another array according to an embodiment of this application.
Figure 40:
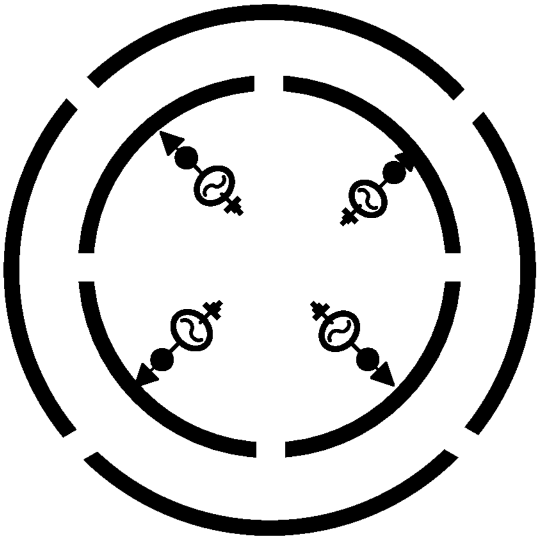
FIG. 40 is a schematic diagram of a structure of a further array according to an embodiment of this application.
Figure 41:
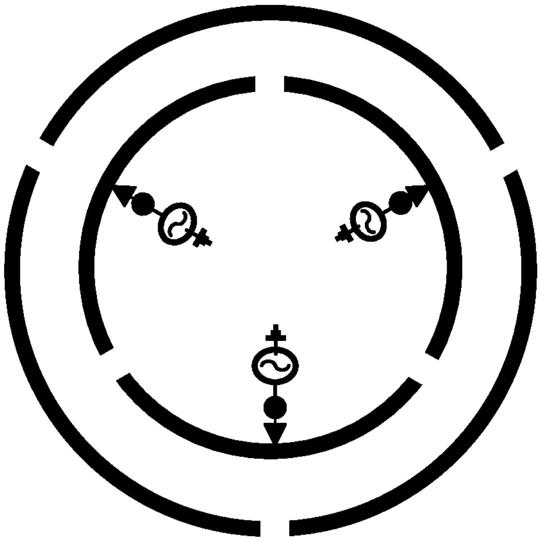
FIG. 41 is a schematic diagram of a structure of a still further array according to an embodiment of this application.

FIG. 39 to FIG. 41 are each a schematic diagram of a structure of still yet another array according to an embodiment of this application.

As shown in FIG. 39, an arrangement manner of an antenna unit and a decoupling member is not limited in this application. As long as there is partial overlapping in a direction corresponding to the antenna unit and the decoupling member, the decoupling member can generate a coupling current, so that isolation between adjacent antenna units can be improved. As shown in FIG. 40, a four-unit antenna array may be arranged in a form of a 2×2 array, or may be arranged in an annular manner. As shown in FIG. 41, a quantity of antenna units in an antenna array may not be limited to four, and may be three.

It should be understood that an arrangement shape of the antenna array is not limited in this embodiment of this application, and may be a rectangle, a circle, a triangle, or another shape. A quantity of antenna units is not limited, and may be adjusted based on a design or production requirement.

It should be understood that when the antenna structure provided in this embodiment of this application is applied to a MIMO system, an antenna formed by each radiator may work in a time-division duplex (time-division duplex, TDD) mode or a frequency-division duplex (frequency-division duplex, FDD) mode. That is, the antenna can work in different frequency ranges. For example, two antennas are used as an example. An operating frequency band of a first antenna may cover a receive frequency band of the FDD mode, and an operating frequency band of a second antenna may cover a transmit frequency band of the FDD mode. Alternatively, the first antenna and the second antenna may work at high and low power in a same frequency band in the FDD mode or the TDD mode. Operating frequencies of the first antenna and the second antenna are not limited in this application, and may be adjusted based on an actual design or production requirement.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:

a first decoupling member;

a first radiator comprising a first feed point;

a second radiator comprising a second feed point, wherein a first gap is formed between the first radiator and the second radiator;

a first feed unit, wherein the first feed unit provides feeding at the first feed point;

a second feed unit, wherein the second feed unit provides feeding at the second feed point; and a rear cover;

wherein the first radiator does not comprise a ground point, and the second radiator does not comprise a ground point;

wherein the first decoupling member is indirectly coupled to the first radiator and the second radiator;

wherein the first decoupling member is disposed on a surface of the rear cover, and is not connected to any other components of the electronic device; and wherein the first decoupling member does not overlap a first projection, the first projection is a projection of the first radiator on the rear cover in a first direction, the first decoupling member does not overlap a second projection, the second projection is a projection of the second radiator on the rear cover in the first direction, and the first direction is a direction perpendicular to a plane on which the rear cover is located.

2. The electronic device according to claim 1, wherein:

the first feed point is disposed in a central region of the first radiator; and the second feed point is disposed in a central region of the second radiator.

3. The electronic device according to claim 1, wherein, when the first feed unit provides feeding, the second radiator is coupled with the first radiator to generate a first induced current, the second radiator is coupled with the first decoupling member to generate a second induced current, and a direction of the first induced current is opposite to a direction of the second induced current.

4. The electronic device according to claim 1, wherein, when the second feed unit provides feeding, the first radiator is coupled with the second radiator to generate a third induced current, the first radiator is coupled with the first decoupling member to generate a fourth induced current, and a direction of the third induced current is opposite to a direction of the fourth induced current.

5. The electronic device according to claim 1, wherein the first radiator, the second radiator, and the first decoupling member are symmetrical along the first gap.

6. The electronic device according to claim 1, wherein the electronic device further comprises:

a first parasitic stub disposed on a side of the first radiator; and a second parasitic stub disposed on a side of the second radiator.

7. The electronic device according to claim 1, wherein the electronic device further comprises:

a third feed unit;

a fourth feed unit;

a third radiator comprising a third feed point, wherein the third feed unit provides feeding at the third feed point, and wherein a second gap is formed between the second radiator and the third radiator;

a fourth radiator comprising a fourth feed point, wherein the fourth feed unit provides feeding at the fourth feed point, wherein a third gap is formed between the third radiator and the fourth radiator, and wherein and a fourth gap is formed between the fourth radiator and the first radiator;

a second decoupling member;

a third decoupling member; and a fourth decoupling member;

the first decoupling member, the second decoupling member, the third decoupling member, and the fourth decoupling member are disposed on an outer side of a region enclosed by the first projection, the second projection, a third projection, and a fourth projection, wherein the third projection is a projection of the third radiator on the rear cover in the first direction, and wherein the fourth projection is a projection of the fourth radiator on the rear cover in the first direction; and wherein the second decoupling member, the third decoupling member, and the fourth decoupling member are disposed on the surface of the rear cover.

8. The electronic device according to claim 7, wherein the first feed point is disposed in a central region of the first radiator;

the second feed point is disposed in a central region of the second radiator;

the third feed point is disposed in a central region of the third radiator; and the fourth feed point is disposed in a central region of the fourth radiator.

9. The electronic device according to claim 7, wherein the first radiator, the second radiator, the third radiator, and the fourth radiator are arranged in a form of a 2×2 array or in an annular manner.

10. The electronic device according to claim 7, wherein the electronic device further comprises:

a first neutralization member; and a second neutralization member;

wherein the first neutralization member and the second neutralization member are disposed on an inner side of a region enclosed by the first projection, the second projection, the third projection, and the fourth projection, or wherein the first neutralization member and the second neutralization member are disposed on an inner side of a region enclosed by the first radiator, the second radiator, the third radiator, and the fourth radiator;

wherein one end of the first neutralization member is close to the first radiator, and the other end is close to the third radiator; and wherein one end of the second neutralization member is close to the second radiator, and the other end is close to the fourth radiator.

11. The electronic device according to claim 10, wherein the electronic device further comprises:

an antenna support, wherein the first radiator, the second radiator, the third radiator, and the fourth radiator are disposed on a surface of the antenna support.

12. The electronic device according to claim 11, wherein the first neutralization member and the second neutralization member are disposed in one of the following ways:

the first neutralization member is disposed on the surface of the rear cover, and the second neutralization member is disposed on the surface of the antenna support;

the first neutralization member is disposed on the surface of the antenna support, and the second neutralization member is disposed on the surface of the rear cover;

the first neutralization member and the second neutralization member are disposed on the surface of the rear cover; or the first neutralization member and the second neutralization member are disposed on the surface of the antenna support.

13. The electronic device according to claim 12, wherein, based on the first neutralization member and the second neutralization member being disposed on the surface of the rear cover, the first neutralization member partially overlaps the first projection and the third projection in the first direction, and the second neutralization member partially overlaps the second projection and the fourth projection in the first direction.

14. The electronic device according to claim 7, wherein the first decoupling member, the second decoupling member, the third decoupling member, and the fourth decoupling member are polyline-shaped.

15. The electronic device according to claim 1, wherein a length of the first decoupling member is a half of a wavelength corresponding to a resonance point of a resonance generated by the first radiator or the second radiator.

16. The electronic device according to claim 1, wherein a distance between the first radiator and the second radiator ranges from 3 mm to 15 mm.

17. The electronic device according to claim 1, wherein a coupling gap between the decoupling member and each of the first radiator and the second radiator ranges from 0.1 mm to 3 mm.

18. The electronic device according to claim 1, wherein the first feed unit and the second feed unit are the same feed unit.

* * * * *